United States Patent [19]
Kim et al.

[11] Patent Number: 5,926,573
[45] Date of Patent: Jul. 20, 1999

[54] MPEG BIT-STREAM FORMAT CONVERTER FOR CHANGING RESOLUTION

[75] Inventors: Hee-Yong Kim, Plainsboro, N.J.; Saiprasad V. Naimpally, Langhorne, Pa.

[73] Assignee: Matsushita Electric Corporation of America, Secaucus, N.J.

[21] Appl. No.: 08/624,263

[22] Filed: Mar. 29, 1996

Related U.S. Application Data

[63] Continuation-in-part of application No. 08/593,672, Jan. 29, 1996, Pat. No. 5,737,019.

[51] Int. Cl.$^6$ .............................. G06K 9/36; H04N 7/12
[52] U.S. Cl. ......................... 382/239; 382/232; 348/415
[58] Field of Search ................................... 382/239, 236, 382/232, 248; 348/443, 445, 454, 455, 432, 441, 555, 556, 390, 433, 434, 558, 415

[56] References Cited

U.S. PATENT DOCUMENTS 5,270,813   12/1993   Puri et al. ............................... 348/415

OTHER PUBLICATIONS

Jill Boyce, John Henderson and Larry Pearlstein, "SDTV Receivers with HDTV Decoding Capability," ACATS Technical Subgroup Meeting, May 18, 1995, Washington, D.C., (18 pp).

H. Blair Benson, revised by Jerry Whitaker, "Television Engineering Handbook", Copyright 1992, 1986, by McGraw Hill, Inc., (pp. 18.2–18.7).

*Primary Examiner*—David K. Moore
*Assistant Examiner*—Wenpeng Chen
*Attorney, Agent, or Firm*—Ratner & Prestia

[57] ABSTRACT

An apparatus or transforming the resolution of an image from a first image resolution to a second image resolution using operations in the spatial frequency domain. The apparatus converts the bit-stream format which defines the first image and can be used to, for example, change the resolution of an MPEG encoded video signal by converting the MPED bitstream. The apparatus generates converted macroblocks from original macroblocks. During conversion, the apparatus determines whether the converted macroblock is (1) intra or non-intra coded, (2) P-coded or B-coded, and (3) in field format or frame format. The apparatus may also include the selection of a motion vector for the converted macroblock from the original macroblocks. Further, the apparatus may also map a first group of transform values which represent the image at the first image resolution to a second group of transform values which represent the image the second image resolution in the spatial frequency domain.

22 Claims, 10 Drawing Sheets

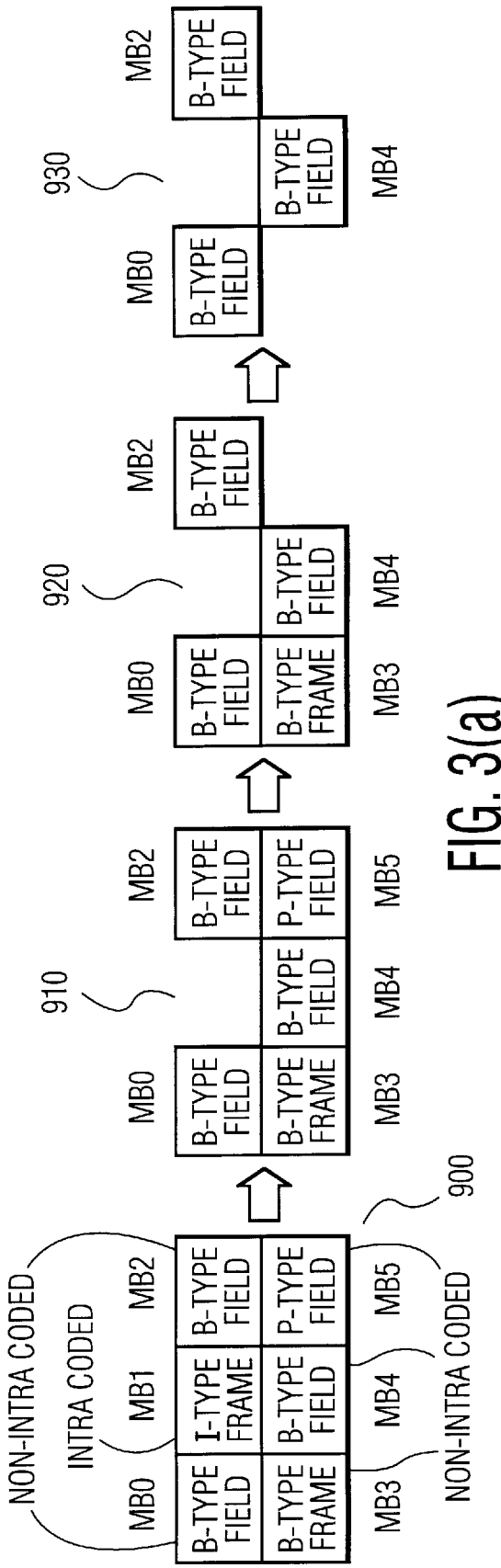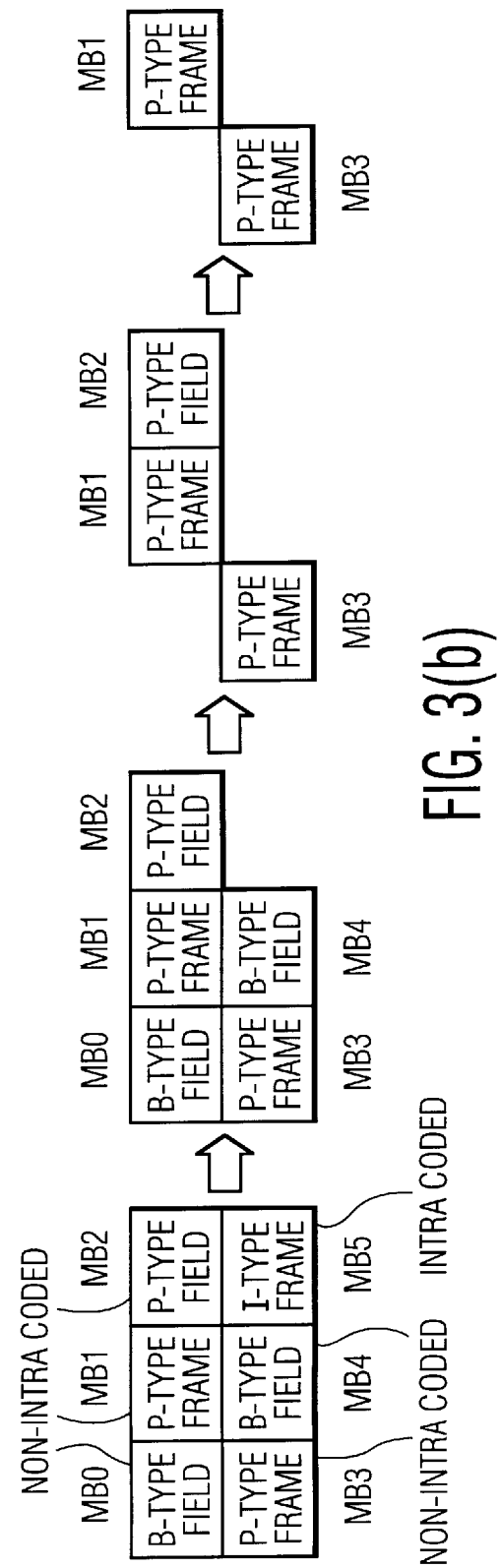
FIG. 3(a)
FIG. 3(b)

FIG. 5(a)

|   | U 0 | 1 | 2 | 3 | 4 | 5 | 6 | 7 |
|---|---|---|---|---|---|---|---|---|
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| V 7 | 35 | 36 | 48 | 49 | 57 | 58 | 62 | 63 |

FIG. 5(b)

|   | U 0 | 1 | 2 | 3 | 4 | 5 | 6 | 7 |
|---|---|---|---|---|---|---|---|---|
| 0 | 0 | 4 | 6 | 20 | 22 | 36 | 38 | 52 |
| 1 | 1 | 5 | 7 | 21 | 23 | 37 | 39 | 53 |
| 2 | 2 | 8 | 19 | 24 | 34 | 40 | 50 | 54 |
| 3 | 3 | 9 | 18 | 25 | 35 | 41 | 51 | 55 |
| 4 | 10 | 17 | 26 | 30 | 42 | 46 | 56 | 60 |
| 5 | 11 | 16 | 27 | 31 | 43 | 47 | 57 | 61 |
| 6 | 12 | 15 | 28 | 32 | 44 | 48 | 58 | 62 |
| V 7 | 13 | 14 | 29 | 33 | 45 | 49 | 59 | 63 |

FIG. 5(c)

|   | U 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 |
| 6 | 48 | 49 | 50 | 51 | 52 | 53 | 54 | 55 |
| V 7 | 56 | 57 | 58 | 59 | 60 | 61 | 62 | 63 |

MPEG BIT-STREAM FORMAT CONVERTER FOR CHANGING RESOLUTION

This application is a continuation in part of U.S. application 08/593,672 filed Jan. 29, 1996, now U.S. Pat. No. 5,737,019 and entitled METHOD AND APPARATUS FOR CHANGING RESOLUTION BY DCT MAPPING

FIELD OF THE INVENTION

This invention relates to a processor for changing the resolution of an image by converting a bit-stream format which defines the image, and more particularly, to changing the resolution of an encoded image, e.g., an image represented by MPEG-2 encoded video signals, by changing the data and control information of the encoded image.

BACKGROUND OF THE INVENTION

In the United States a standard has been proposed for digitally encoded high definition television signals. A portion of this standard is essentially the same as the MPEG-2 standard, proposed by the Moving Picture Experts Group (MPEG) of the International Organization for Standardization (ISO). The standard is described in a International Standard (IS) publication entitled, "Information Technology—Generic Coding of Moving Pictures and Associated Audio, Recommendation H.626", ISO/IEC 13818-2: 1995 (E) which is available from the ISO and which is hereby incorporated by reference for its teaching on the MPEG-2 digital video coding standard.

The MPEG-2 standard is actually several different standards. In MPEG-2, several different profiles are defined, each corresponding to a different level of complexity of the encoded image. For each profile, different levels are defined, each level corresponding to a different image resolution. One of the MPEG-2 standards, known as Main Profile, Main Level (MP@ML) is intended for coding video signals conforming to existing television standards (i.e., NTSC and PAL). Another standard, known as Main Profile, High Level (MP@HL) is intended for coding high-definition television images.

Images encoded according to the MP@HL standard may have as many as 1,152 active lines per image frame and 1,920 pixels per line. The MP@ML standard, on the other hand, defines a maximum picture size of 720 pixels per line and 567 lines per frame. The high definition television standard proposed for HDTV encoding in the United States is a subset of the MP@HL standard, having as many as 1,080 lines per frame, 1,920 pixels per line and a maximum frame rate, for this frame size, of 30 frames per second.

The MPEG-2 standard defines a complex syntax which contains a mixture of data and control information. Some of this control information is used to enable signals having several different formats to be covered by the standard. These formats define images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group of pictures layer, the picture layer, the slice layer, the macroblock layer, and the block layer. Each of these layers except the block layer is introduced with control information. Finally, other control information, also known as side information, (e.g. frame type, macroblock pattern, image motion vectors, coefficient zig-zag patterns and dequantisation information) are interspersed throughout the coded bit stream.

An implementation of a HDTV system should be compatible with existing systems such as NTSC and PAL. Accordingly, to effectively receive the digital images, an HDTV decoder should be able to generate a picture corresponding to the MP@HL standard or the MP@ML standard to provide compatibility (i.e., through a set-top decoder) with existing receivers. For example, the HDTV decoder should be able to generate a picture corresponding to the MP@HL standard from a MP@ML encoded signal or a picture corresponding to the MP@ML standard from a MP@HL encoded signal.

In addition, the use of new receivers having a high definition video monitor which can display an image generated from a MP@HL signal may be cost prohibitive for certain customers. Accordingly, an HDTV decoder which can generate a picture corresponding to the MP@HL standard or the MP@ML standard will allow the use of newer, lower cost receivers which have video monitors that provide a higher resolution than MP@ML but less than MP@HL. A television set containing one of these monitors should still be able to display an image generated from a MP@HL signal albeit at a lower resolution.

Using existing techniques, a decoder may be implemented using an interpolation circuit to interpolate or decimate signals in the pixel domain to reduce the resolution of the image from MP@HL to the MP@ML. To process an MP@HL encoded image to produce an MP@ML signal by these conventional methods, the MP@H encoded image is converted from the spatial frequency domain to the pixel domain, interpolated to produce a reduced resolution image, and then the interpolated image is converted back to the spatial frequency domain. This type of processing would be contrary to the implementation of a decoder in a consumer television receiver in which cost is a major factor, Additional circuitry would be required to decode, interpolate or decimate, and then code the signal. Furthermore, the decoding and encoding operations may introduce undesired artifacts into the image that is represented by the reduced-resolution coded signal.

Another alternative is to use a decoder which selects a portion of the incoming HDTV bit stream, before decoding, as shown in SDTV RECEIVERS WITH HDTV DECODING CAPABILITY, by Jill Boyce et al., dated February 1995 and presented at the ACATS Technical Subgroup Meeting, May 18, 1995. The decoder disclosed in the paper utilizes a number of techniques in an attempt to reduce the cost and complexity for a standard television receiver. A pre-parser examines the incoming bit-stream and discards coding elements, DCT coefficients, of less importance. These elements include the high frequency DCT coefficients. The coding elements are then converted from the spatial frequency domain to pixels in the pixel domain. The pixels are then down-sampled to produce pixel for a lower resolution image.

There are other systems which have been proposed which utilizes other transform techniques to encode an image. For example, Fourier Transforms have been used to encoded images in the spatial frequency domain. One such system is shown at page 18.3 of the *Television Engineering Handbook* by K. Blair Benson, dated 1992, which is incorporated herein by reference for its teachings on digitally encoding images. This system utilizes Fourier Transforms to encode the image. As in the MPEG standard, this system could be used to encode images at different resolutions. Thus, the need for the conversion between higher and lower resolution images to provided compatibility between different receivers is also required for these systems.

SUMMARY OF THE INVENTION

The present invention is embodied in an apparatus for transforming the resolution of an image from a first image resolution to a second image resolution using operations in the spatial frequency domain. The apparatus generates converted macroblocks from the original macroblocks. During conversion, the apparatus determines whether the converted macroblock is (1) intra or non-intra coded, (2) P-coded or B-coded, and (3) in field format of frame format. First, the converted macroblock is designated (1) non-intra for the slice layer, and the macroblock layer header, coded if a majority of original macroblocks are non-intra coded or (2) intra coded if the majority of the original macroblocks are intra coded. Next, the apparatus designates the prediction type of the converted non-intra macroblock as (1) P-coded if a majority of the non-intra coded original macroblocks are P-coded or (2) B-coded if the majority of the non-intra coded original macroblocks are B-coded. Then, a first macroblock group is selected as (1) the original macroblocks which are P-coded and non-intra coded if the converted macroblock is designated P-coded or (2) the original macroblocks which are B-coded and non-intra coded if the converted macroblock is designated B-coded. Then, the original macroblocks having the same coding type as the converted non-intra macroblock ("the same coding type original macroblocks") are used to determine the motion type of the converted non-intra macroblock. The motion type of the converted macroblock is designated as (1) field format if a majority of the same coding type original macroblocks are in field format or (2) frame format if a majority of the same coding type original macroblocks are in frame format.

The present invention further relates to selecting a motion vector or the converted macroblock from the original macroblocks.

The present invention also relates to mapping a first group of transform values which represent the image at the first image resolution to a second group of transform values which represent the image at the second image resolution in the spatial frequency domain.

BRIEF DESCRIPTION OF THE DRAWINGS

FIGS. 3(a) and 3(b) are data structure diagrams illustrating the operation of steps 700, 800, 810, and 820 shown in FIG. 1.

FIGS. 5(a) and 5(b) are charts illustrating the format of the MPEG scan pattern 0 and the MPEG scan pattern 1.

FIG. 5(c) is a chart illustrating the format of the DCT coefficients after inverse zig-zag scan by inverse zig-zag scan memory 120 shown in FIG. 1.

DETAILED DESCRIPTION OF THE EXEMPLARY EMBODIMENTS

Overview

The exemplary embodiment of the invention determines the organization and format of a converted macroblock produced from original macroblocks where the original macroblocks represent an image at a first image resolution and the converted macroblock represent the image at a second image resolution. The original macroblocks are transformed into the converted macroblock using operations in the spatial frequency domain. During conversion, the exemplary embodiment determines whether the converted macroblock (1) is intra or non-intra coded, (2) has a prediction type of P-coded or B-coded, and (30) has a motion type of field format or frame format. These determinations are made using (1) the intra or non-intra coding, (2) the prediction type, and (3) the motion type, of the original macroblocks. The exemplary embodiment also determines the motion vector for the converted macroblock using the motion vectors of the original macroblocks.

Exemplary Embodiment

Figure 1:
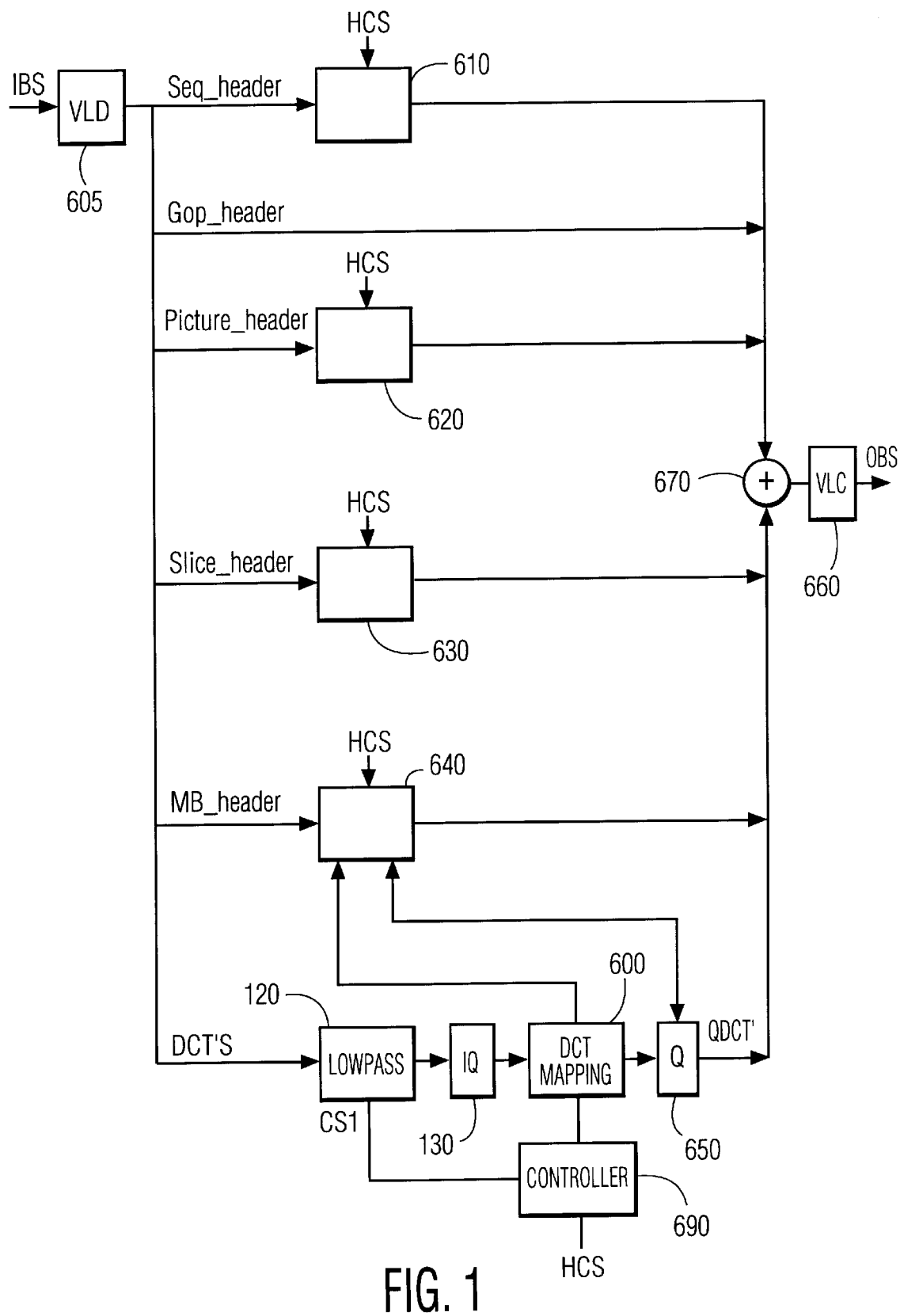
FIG. 1 is a block diagram of an exemplary embodiment of the present invention directed to an MPEG-2 bit stream conversion circuit.

FIG. 1 is an exemplary embodiment of the present invention directed to MPEG-2 bit stream conversion circuitry. In this embodiment, in addition to changing the resolution of the image by DCT mapping described below, new header information and motion vectors are produced for resulting images. In the exemplary embodiment shown in FIG. 1, the original motion vectors are scaled and a suitable motion vector is generated from the macroblocks in the original image to produce motion vectors for the new macroblocks in the different resolution image.

The basic syntax of the MPEG-2 Main Profile defines the compressed MPEG-2 bit stream as a sequence of images in five layers, the sequence layer, the group pictures layer, the picture layer, the slice layer, and the macroblock layer. Each of these layers is introduced with control information: the sequence header, Seq_header for the sequence layer, the group of pictures header, GOP_header for the group of pictures layer, the picture header, Picture_header, for the picture layer, the slice header, Slice_header, MB_header, for the macroblock layer. Finally, other control information, also known as side information, (e.g. frame type, macroblock pattern, image motion vectors, coefficient zig-zag patterns and dequantisation information) are interspersed throughout the coded bit stream.

As shown in FIG. 1, an input bit-stream IBS containing the layers and control information is applied to variable length decoder (VLD) 605. The input bit-stream is, for example, a MP@HL encoded bit-stream. VLD 605 decodes the input bit stream IBS to recover the header information and to generate blocks of quantised discrete cosine transform (DCT) coefficient values. In addition, VLD 605 reorders the quantised coefficients values by performing an inverse zig-zag scan. The DCT coefficient values in the macroblocks are provided one value at a time in formats specified by the above referenced MPEG-2 specification. FIGS. 5(a) and 5(b) illustrate the two different zig-zag scan patterns: pattern 0 and pattern 1, used in the MPEG-2 specification. In VLD 605, the type of scan pattern is detected and the DCT coefficient values are rearranged as shown in FIG. 5(c).

The quantised DCT coefficient values QDCT are provided to filter 120. Filter 120 is a low pass filter which diagonally truncates the macroblocks to eliminate the high frequency components of the image when the image resolution is to be reduced. Filter 120 does not filter the macroblocks when a higher resolution image is produced from a lower resolution image. A control signal CS1 enables or disables filter 120. Filter 120 is used to prevent aliasing distortion when the resolution of the image is reduced.

VLD 605 also provides the sequence header Seq_header to a first converter 610, the group of pictures header Gop_header to a combiner 670, the picture header Picture_header to the second converter 620, the slice header Slice_header to third converter 630, and the macroblock layer header MB_header to the fourth converter 640. The first, second, and third converters 610, 620, and 630 make minor, mostly fixed value changes to the sequence header, Seq_header; the picture header, Picture_header; and the slice header Slice_header, respectively, in response to the change of resolution.

The sequence header Seq_header, the picture header Picture_header, and the slice header Slice_header are modified in response to the size conversion factor specified for the image represented by the input bit stream IBS. The formats of each of the headers are specified in the above referenced MPEG-2 standard at sections 6.2 and 6.3. Converters 610–640 modify the headers Seq_header, Picture_header, and Slice_header in response to header control signal HCS which specifies the change from the input image resolution to the output image resolution and any additional data produced during the conversion process. Control signal HCS is produced by controller 690.

For example, the intra_slice code in the slice header Slice_header indicates whether any of the macroblocks in the slice are non-intra coded macroblocks. A macroblock is non-intra coded if it uses information from itself and other macroblocks occurring at different frame times. During conversion, as described below, the intra or non-intra coding of the macroblocks can change. As a result, the intra_slice code in the slice header Slice_header may change to indicate whether any of the converted macroblocks CMB in the converted slice are non-intra coded.

Further, in the sequence header Seq_header, the vertical size and the horizontal size of the image are changed to correspond to the horizontal and vertical dimensions of the converted image. In addition, the bit rate is changed to correspond to the reduction or increase in the data rate caused by the change in resolution. The virtual buffering verifier (VBV) size is also changed. The virtual buffering verifier size provides a constraint in the variability of the data rate that an encoder or editing process may produce. The virtual buffering verifier size is described in "Information Technology Generic Coding of Moving Pictures and Associated Audio, Recommendation H.626", ISO/IEC 13818-2: 1995 (E), Annex C, which is herein incorporated by reference. Each of the changes in the sequence header Sequence_header directly correspond to the change in resolution.

In the picture header, Picture_header, for example, the forward_f_code, backward_f_code, and virtual buffering delay are modified. The virtual buffering delay is described in "Information Technology—Generic Coding of Moving Pictures and Associated Audio, Recommendation H.626", ISO/IEC 13818-2: 1995 (E), page 57 and Annex C, and is herein incorporated by reference.

Figure 4:
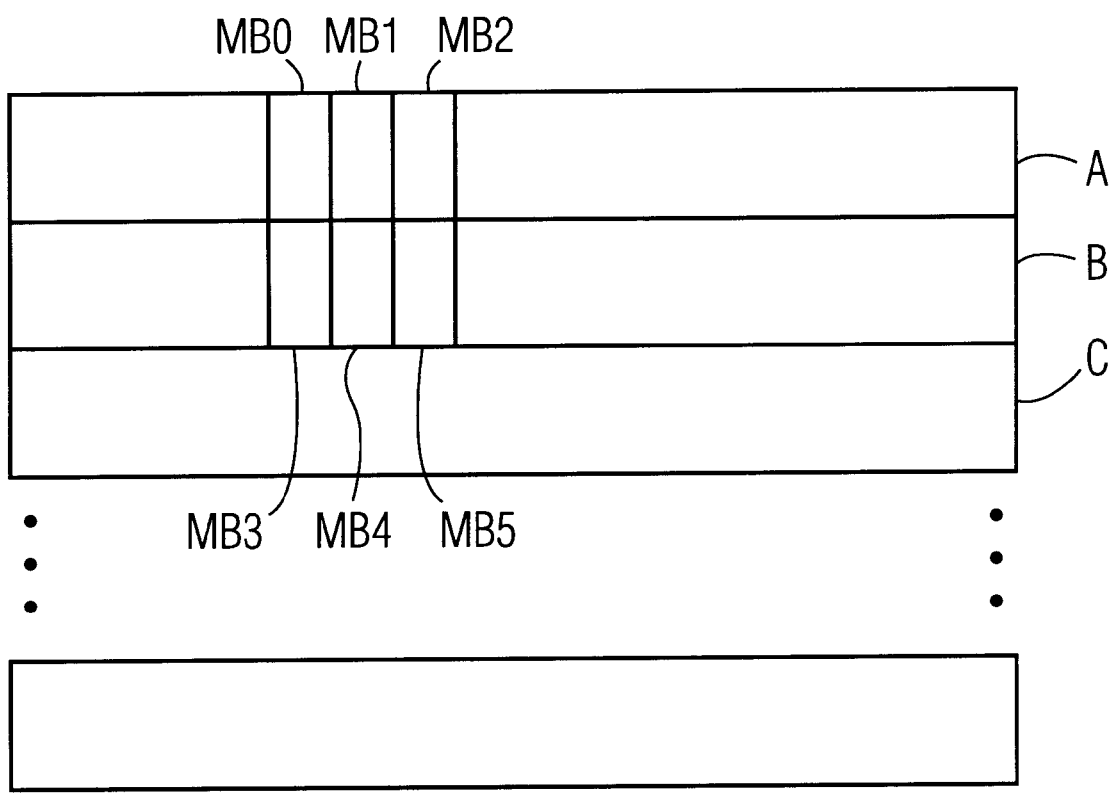
FIG. 4 is a data structure diagram illustrating the organization of macroblocks in a slice.
Figures 8A, 8B, 8C:
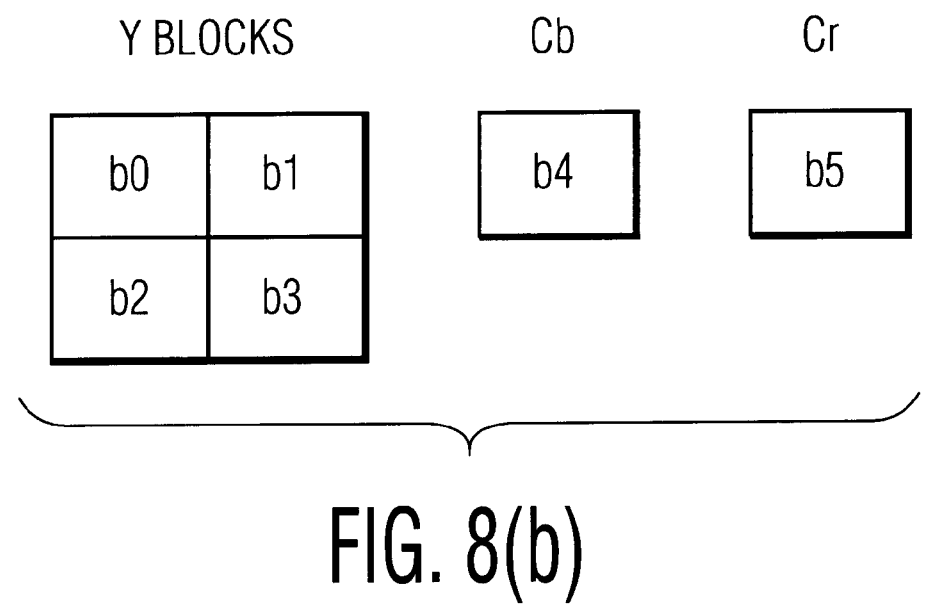
FIG. 8(a) is a data structure diagram illustrating six macroblocks.
FIG. 8(b) is a data structure diagram illustrating the contents of one of the macroblocks shown in FIG. 8(a).
FIG. 8(c) is a data structure diagram illustrating a converted macroblock CMB generated from the six macroblocks shown in FIG. 8(a).

In the slice header, slice_header, the slice_start_code is changed to identify the start of the converted slice. The slice_start_code indicates the start of a slice, such as slice A shown in FIG. 4. The slice_start_code is changed to indicated the start of the converted slice containing the converted macroblocks CMB. In addition, the quantiser_scale_code is changed. For example, as is shown in FIG. 4, macroblocks MB0–MB2 and MB3–MB5 from FIG. 8(a) are contained in slices A and B, respectively. Slices A and B can have different quantiser_scale_codes. In this case, the quantiser_scale codes of slice A and slice B are averaged to produce an average quantiser_scale_code for the slice header Slice_header of the converted slice which contains the converted macroblocks CMB. Further, the intra_slice code is changed. The intra_slice code indicates whether any of the macroblocks in the slice are non-intra coded macroblocks. As a result of the conversion to increase or decrease resolution, as described below, the intra or non-intra coding of the macroblocks can change. The intra_slice code is changed to indicate whether any of the converted macroblocks CMB in the converted slice are non-intra coded. The slice_vertical position is also changed to identify the vertical position in macroblock units of the first converted macroblock in the slice since the number of macroblocks in the original image is changed.

The motion vectors provided with the macroblocks in the original image generally require modification after decimation or interpolation of the macroblocks because, in changes in the size of the image, both the reference to the macroblock and the scale of the motion vector change. Whether a macroblock has a motion vector depends upon whether the macroblock is intra coded or non-intra coded. A macroblock is intra coded (I-coded) if it is coded using only information from a single frame. A macroblock is non-intra coded if it is coded using motion compensated prediction from past reference fields or frames (P-coded) or coded using motion compensated prediction from past and/or future reference fields or frames (B-coded).

The original DCT coefficient values $F_{i'j'}(u',v')$ are dequantised by inverse quantiser 130 and then mapped into converted DCT coefficient values $F_{ij}(u,v)$ by DCT converter 600. DCT converter 600 operates as described below with reference to FIG. 6, to convert original DCT coefficient values to converted DCT coefficient values. DCT converter 600 also performs additional operations described below. Further, DCT converter 600 includes memories (not shown in FIG. 1) for storing the pre-computed values PCV, original DCT coefficients, and converted DCT coefficients.

The original DCT coefficient values $F_{i'j'}(u',v')$ are provided to DCT converter 600 to generate the converted macroblock CMB. In the exemplary embodiment of the invention, a region defined by two macroblocks vertically and three macroblocks horizontally of a coded input image having a resolution from 1920 pixels by 1024 pixels are used to produce a single macroblock of a coded output image having a resolution of 640 pixels by 540 pixels. A portion of the input image corresponding to the entire width of the picture is stored. This portion of the image includes one or more slices. A slice is a consecutive series of macroblocks which represent a group of sixteen consecutive horizontal lines of the image. For example, for a MP@HL encoded signal, 240 consecutive macroblocks span the width of the image.

In FIG. 4, macroblocks MB0–MB2 and MB3–MB5 from FIG. 8(a) are shown as being contained in slices A and B, respectively. As the converted macroblocks are generated, macroblocks MB0–MB2 in slice A are stored in the memory (not shown) of DCT converter 600. Macroblocks MB3–MB5 in slice B are provided to and stored in the memory and used in combination with macroblocks MB0–MB2 which have been retrieved from the memory to generate the converted macroblock CMB shown in FIG. 8(c).

In addition to generating the converted DCT coefficient values $F_{ij}(u,v)$ in the converted macroblock CMB, DCT converter 600 also processes the macroblocks in response to the motion parameters of the macroblock. The operation of the circuitry for processing the macroblocks to generate motion parameters for the converted macroblocks is explained in greater detail below.

Figure 2:
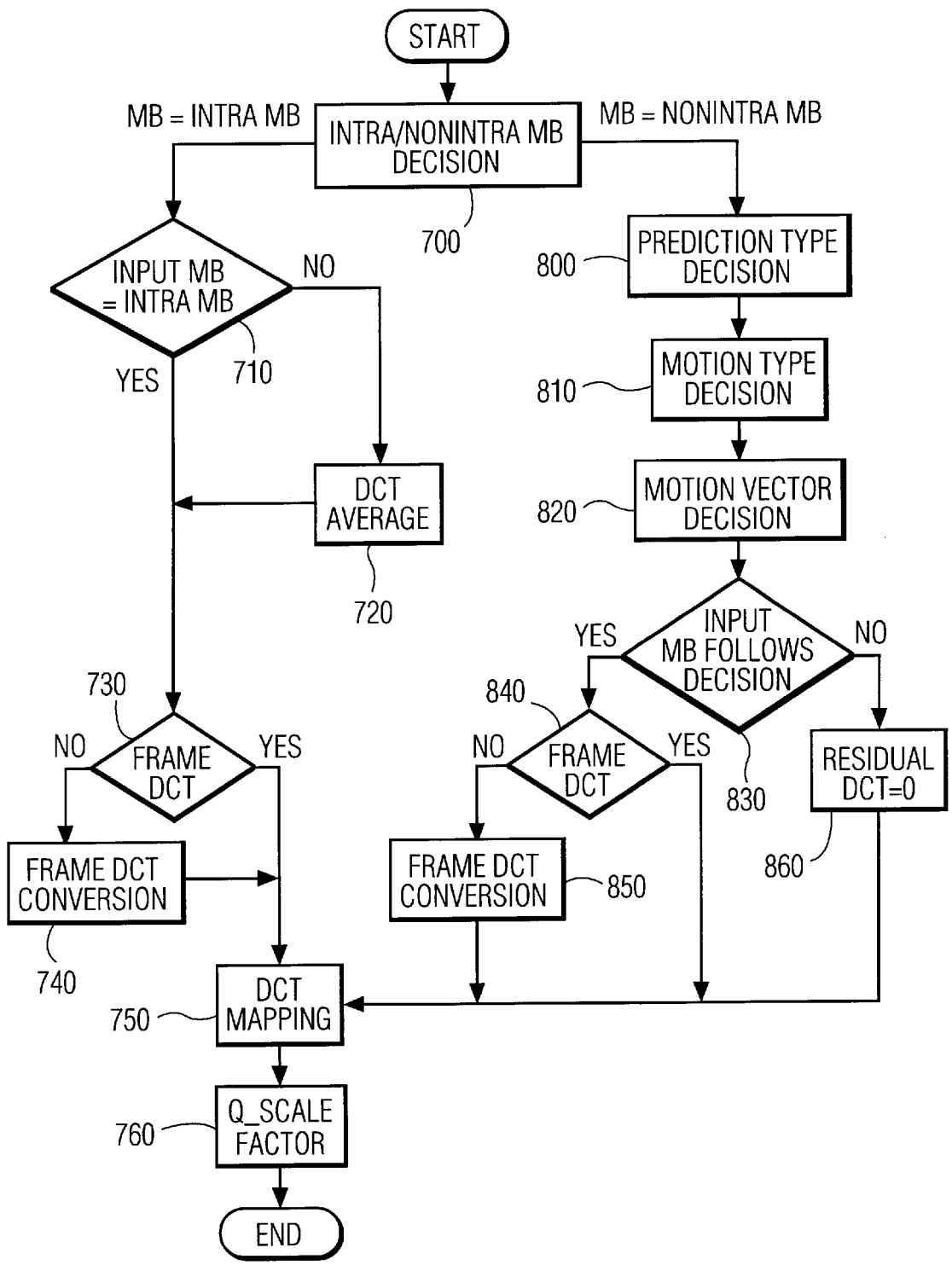
FIG. 2 is a flow chart illustrating the operation of the MPEG-2 bit stream down conversion circuit shown in FIG. 1.

As shown in FIG. 2, at step 700, the DCT converter 600 determines whether the macroblock is to be a non-intra or intra coded macroblock. As shown for example in FIG. 9, six macroblocks MB0–MB5 may be converted to one macroblock CMB. In other words, the resolution of the picture containing the six macroblocks MB0–MB5 is changed from 1920 by 640 pixels per frame to 640 by 540 pixels per frame. Further, each of the six macroblocks MB0–MB5 can be either non-intra coded or intra coded. Therefore, it is desirable to determine whether the converted macroblock is to be non-intra coded or intra coded based on the original six macroblocks MB0–MB5. DCT converter 600 employs a majority rule using the original macroblocks MB0–MB5 to determine if the converted macroblock is non-intra coded or intra coded.

With reference to FIG. 8(a), for example, if four of the original macroblocks MB0, MB1, MB2, and MB4 are non-intra coded and two of the original macroblocks MB3 and MB5 are intra coded, then the converted macroblock is non-intra coded. Alternatively, if four of the original macroblocks MB0, MB1, MB2, and MB4 are intra coded and two of the original macroblocks MB3 and MB5 are non-intra coded, then the converted macroblock is intra coded. If three of the original macroblocks MB0, MB1, and MB4 are non-intra coded and three of the original macroblocks MB2, MB3 and MB5 are intra coded, the inventor has determined that the code type of the converted macroblock is non-intra coded.

Returning to FIG. 2, if the converted macroblock CMB is determined to be an intra coded macroblock at step 700, then, at step 710, the original intra coded macroblocks MB0–MB5 are provided to step 730 and the non-intra coded original macroblocks MB0–MB5 are provided to step 720. At step 720, each of the original DCT coefficient values $F'_{i'j'}(u',v')$ in the original non-intra coded macroblocks MB0–MB5 are replaced with a corresponding average DCT coefficient value which is produced by averaging corresponding original DCT coefficient values $F'_{i'j'}(u',v')$ of the original intra coded macroblocks MB0–MB5.

For example, assume macroblocks MB3 and MB5 are non-intra coded and macroblocks MB0–MB2 and MB4 are intra coded. A corresponding DCT average value of the original DCT coefficient values $F'_{i'j'}(u',v')$ is each of the intra coded original macroblocks MB0–MB2 and MB4 is provided and each of the original DCT coefficient values $F'_{i'j'}(u',v')$ in the non-intra macroblocks MB3 and MB5 are replaced with a corresponding average DCT value. For example, the original DCT coefficient values $F'_{i'j'}(u',v')$ of the original intra coded macroblocks MB0–MB2 and MB4 representing the high frequency components of the image are averaged and used to replace a corresponding high frequency component of macroblocks MB3 and MB5. After step 720, or after step 710, step 730 is executed.

At step 730, it is determined whether the macroblocks MB0–MB5 are in field or frame DCT format. At step 740, the macroblocks MB0–MB5 is converted to frame DCT format it if is determined that the macroblock MB0–MB5 is in field DCT format. The format of the macroblock is converted so that each of the macroblocks is processed in the same format. This simplifies the operation of the system. In an alternative embodiment, the macroblocks MB0–MB5 in frame DCT format may be converted to field DCT format and the macroblocks MB0–MB5 may be processed as described below in field DCT format instead of frame DCT format.

The appropriate steps 710, 720, 730, and 740 are performed for each of the original macroblocks MB0–MB5 used to produce the converted macroblock CMB. For example, original macroblock MB0 is in field format and intra coded. Thus, macroblock MB0 is processed in step 710 and, then, step 730. If the next macroblock MB1 is in field format and non-intra coded, then macroblock MB1 is processed through step 710, step 720, step 730 and step 740. Each of the other original macroblocks MB2–MB5 is processed appropriately depending upon the format and coding of each of the original macroblocks MB0–MB5.

Next, at step 750, the DCT coefficients in the original macroblocks MB0–MB5 are mapped into converted DCT coefficient values $F_{ij}(u,v)$. The mapping performed at step 750 is described below with reference to FIGS. 6, 7(a), and 7(b). At step 760, a quantised scale factor Q_scale is obtained for the converted macroblock based on the change in resolution of the image.

Returning to FIG. 1, the converted DCT coefficients $F_{ij}(u,v)$ provided by the DCT converter 600 are quantised by quantiser 650 using the quantised scale factor Q_scale produced by DCT converter 600. The quantised scale factor Q_scale determined at step 760, shown in FIG. 2, and the coding type of the converted macroblock CMB determined at step 700, shown in FIG. 2, are provided to fourth converter 640. The macroblock header MB is then modified by fourth converter 640 using the coding type of the converted macroblock and the quantisation scale factor Q_scale. Finally, the quantised converted DCT coefficients are variable length encoded.

Alternatively, if it is determined at step 700, shown in FIG. 2, that the converted macroblock is to be non-intra coded, then, the original macroblocks MB0–MB5 are processed at stage 700, 800, 810, and 820 as shown in FIGS. 3(a) and 3(b). As illustrated in FIG. 3(a), for step 700, all of the macroblocks 900 are considered, as described above, to determine if the converted macroblock is intra coded. As step 800 shown in FIG. 2, the prediction type of the converted non-intra macroblock is determined. At step 800, the P-type MB is dropped because the prediction type of the converted macroblock is B-type. As shown in FIG. 3(a), only the non-intra coded macroblocks 910 are used to determine the coding type. As described above with regard to step 700, majority rule is used to determine the coding type. In FIG. 3(a), the majority prediction type is B-type, therefore, the converted macroblock CMB is coded B-type. Then, at step 810 shown in FIG. 2 and illustrated in FIG. 3(a), only the B-type macroblocks 920 are used to determine the motion decision type: field prediction or frame prediction. At step 810, one of the B-type blocks is dropped because it uses frame based prediction while the others used field based prediction.

In field prediction, predictions are made independently for each field of data in the macroblock using data from one or more previously decoded fields. Frame prediction forms a prediction for the frame from one or more previously decoded frames. Accordingly, field or frame prediction is selected for the converted macroblock, CMB, based on the field and frame format of the original macroblocks selected at step 800. Majority rule is used to select the field or frame prediction. As illustrated in FIG. 3(a), field prediction is selected at step 810 because original macroblocks MB0, MB2, and MB4 are in the majority and coded using field prediction. Finally, at step 820, the motion vector for the converted macroblock is selected using the remaining macroblocks 930. As in steps 800 and 810, shown in FIG. 2, majority rule is used to select the motion vector.

In the event that there is not a majority from which the prediction type can be determined, the prediction type is selected based on the following order of preference: bi-directional prediction, forward prediction, and backward prediction. For example, if only two macroblocks are remaining from which to select the prediction type, and one is bi-directionally coded and the other is forward coded, then the selected prediction type is bi-directional for the converted macroblock.

In the event that there is not a majority from which the motion type can be determined, the selected motion type is frame type for the converted macroblock. In the event that there is not a majority from which the motion vector can be determined, the first motion vector of the first macroblock processed at step 820, shown in FIG. 2, becomes the selected motion vector for the converted macroblock CMB.

FIG. 3(b) is another data structure diagram illustrating the operation of steps 700, 800, 810, and 820 shown in FIG. 2 in response to different input macroblock MB0-MB5. In FIG. 3(b), the majority of macroblocks are non-intra coded. The non-intra coded macroblocks MB0–MB4 are used at step 800, shown in FIG. 2, to determine the prediction type: P-coded. Then, at step 810, shown in FIG. 2 and illustrated in FIG. 3(b), only the P-coded macroblocks MB1, MB2, and MB3 are used to determine the motion decision type: frame prediction. Finally, at step 820, the motion vector for the converted macroblock is selected using the frame prediction P-type macroblocks MB1 and MB3.

Next, at step 830 shown in FIG. 2, for each original macroblock MB0–MB5, it is determined if the original macroblocks MB0–MB5 have the same prediction type, motion type, and motion vector selected for the converted macroblock CMB. Each original macroblock MB0–MB5 which does not have the same prediction type, motion type and motion vector has its residual original coefficient values set equal to zero at step 860. Otherwise, it is next determined, at step 840 whether the original macroblock is in frame or field format. Then, at step 750, once the macroblock has been converted to frame format at step 850, or if the macroblock is already in frame format, DCT mapping is performed at step 750 as described above.

When the resolution of the image is increased, the number of macroblocks is increased. All of the resulting macroblocks, including the additional macroblocks, are interpolated from the original macroblocks. In this case, the same method is used to selected the intra/non-intra coding, the motion type, the prediction type, and the motion vector for the converted macroblocks. DCT coefficients for the converted macroblocks are also generated by directly mapping the DCT coefficients of the original macroblocks to increase the number of DCT coefficients.

Next, at step 760, a quantisation scale (Q_scale) factor is produced by averaging the quantisation scale factors of the original macroblocks MB0–MB5 which are used to generate the converted macroblock CMB. Quantiser 650, shown in FIG. 1, applies the Q_scale factor to the converted DCT coefficients to produce quantised DCT coefficients values QDCT'.

Next, converter four 640 shown in FIG. 1, generates a converted macroblock header for the converted quantised coefficients values QDCT'. The intra/non-intra macroblock type decision from step 700, the prediction type decision from step 800, the motion type decision from step 810, and the motion vector from step 820, each shown in FIG. 2, are provided to converter four 640 from DCT converter 600. The Q_scale factor is provided from quantiser 650. Converter four 640 uses the intra/non-intra macroblock type decision from step 700, the prediction type decision from step 800, the motion type decision from step 810, and the motion vector from step 820, each shown in FIG. 2, the change in resolution, and the quantisation scale Q_scale, to produce the converted macroblock header.

As shown in FIG. 1, the sequence header Seq_header, the group of picture header Gop_header, the picture header Picture_header, the slice header Slice_header, the macroblock header MB_header, the quantised DCT coefficients values QDCT' are combined at combiner 670 and then variable length encoded at variable length coder 660 to produce an output bit stream OBS. The output bit stream is, for example, a MPEG-2 MP@ML encoded signal.

Overview of DCT Converter

The conversion of the original DCT coefficient values $F'_{i'j'}(u',v')$ to the converted DCT coefficient values $F_{ij}(u,v)$ in the transform domain is feasible because there are correlations of the spatial pixels in the picture before and after the conversion which translates to a correlation between the DCT coefficient values at different resolutions. Transform values in the spatial frequency domain for other transform methods including, for example, Fourier Transforms and Z-transforms, can also be converted to converted transform values because there are correlations of values in the time domain before and after the conversion which translates to a correlation between the transform values at different resolutions.

The original DCT coefficients values $F'_{i'j'}(u',v')$ define an image having a first resolution and are produced by converting the pixels in the image to DCT coefficient values using an N point two-dimensional DCT. The N point two-dimensional DCT is defined in equation (1):

$$F'_{i'j'}(u', v') = \frac{2}{N} \cdot c(u')c(v') \sum_{m=0}^{N-1}\sum_{n=0}^{N-1} f'_{i'j'}(m, n)\cos\frac{(2m+1)u'\pi}{2N}\cos\frac{(2n+1)v'\pi}{2N} \quad (1)$$

$F'_{i'j'}(u',v')$ is the original DCT coefficient value for the j'-th block and the i'-th macroblock where u' and v' are coordinates in the spatial frequency domain and u', v' =0, 1, 2 ... N-1; $f'_{i'j'}(m,n)$ is a pixel value in the image where m and n are spatial coordinates in the pixel domain and m,n=0, ..., N-1, and c(u') and c(v') are the transformation coefficient values defined in equation (2):

$$c(i) = \begin{cases} (1/\sqrt{2}) & \text{for } i = 0 \\ 1 & \text{otherwise} \end{cases} \quad (2)$$

Conversely, a pixel value $f'_{i'j'}(m,n)$ of the image can be produced from the original DCT coefficient values $F'_{i'j'}(u',v')$ using an N point inverse discrete cosine transform (IDCT). The N point IDCT is defined by equation (3):

$$f'_{i'j'}(m, n) = \frac{2}{N} \sum_{u'=0}^{N-1}\sum_{v'=0}^{N-1} c(u')c(v')F'_{i'j'}(u', v')\cos\frac{(2m+1)u'\pi}{2N}\cos\frac{(2n+1)v'\pi}{2N} \quad (3)$$

The resolution of the image can be increased or described by, for example, interpolation or decimation of the pixel values $f'_{i'j'}(m,n)$ in the pixel domain. For example, a converted pixel values $f_{ij}(x,y)$ can be produced from the original pixel values $f'_{i'j'}(m,n)$ using a linear superposition of pixels of the original image in the pixel domain as shown in equation (4):

$$f_{ij}(x, y) = \sum_{i'}\sum_{j'}\sum_{m=0}^{N-1}\sum_{n=0}^{N-1} \alpha_{i',j',m,n}^{i,j,x,y} \cdot f'_{i'j'}(m, n) \quad (4)$$

α is the conversion coefficient between the original pixel values $f'_{i'j'}(m,n)$ and the converted pixel values $f_{ij}(x,y)$. The image defined by the converted pixel values $f_{ij}(x,y)$ has a different resolution than the image defined by the original pixel values $f_{ij}(m,n)$.

Converted DCT coefficient values $F_{ij}(u,v)$ can be produced from the converted pixel values $f_{ij}(x,y)$ using equation (5):

$$F_{ij}(u, v) = \frac{2}{N} \cdot c(u)c(v)\sum_{x=0}^{N-1}\sum_{y=0}^{N-1} f_{ij}(x, y)\cos\frac{(2x+1)u\pi}{2N}\cos\frac{(2y+1)v\pi}{2N} \quad (5)$$

$F_{ij}(u,v)$ is the converted DCT coefficient value for the j-th block and the i-th macroblock where u and v are coordinates in the spatial frequency domain in the converted image and u,v=0, ..., N-1 and $f_{ij}(x,y)$ is the converted pixel value where x and y are spatial coordinates in the pixel domain of the converted image and x,y=0, ..., N-1. The correlation between the original pixel values $f'_{i'j'}(m,n)$ and the converted DCT coefficient values $F_{ij}(u,v)$ is demonstrated below in equation (6) in which equation (5) is rewritten by substituting the right hand side of equation (4) for the converted pixel values $f_{ij}(x,y)$.

$$F_{ij}(u, v) = \frac{2}{N} \cdot c(u)c(v) \cdot \sum_{x=0}^{N-1}\sum_{y=0}^{N-1}\left(\sum_{i'}\sum_{j'}\sum_{m=0}^{N-1}\sum_{n=0}^{N-1}\alpha_{i',j',m,n}^{i,j,x,y} \cdot f'_{i',j'}(m,n)\right)\cos\frac{(2x+1)u\pi}{2N}\cos\frac{(2y+1)v\pi}{2N} \quad (6)$$

Since the original pixel values $f'_{i'j'}(m,n)$ can be expressed in terms of the original DCT coefficient values $F'_{i'j'}(u',v')$ as shown in equation (3), the converted DCT coefficient values $F_{ij}(u,v)$ can be expressed in terms of the original DCT coefficient values $F'_{i'j'}(u',v')$. This is demonstrated in equation (7) below in which the right hand side of equation (3) is substituted for the original pixel values $f'_{i'j'}(m,n)$ shown in equation (6).

This eliminates the need for additional circuitry to convert the original DCT coefficient values $F'_{i'j'}(u',v')$ to pixels values to perform interpolation or decimation and the circuitry required to convert the pixels back to converted DCT coefficient values $F_{ij}(u,v)$ to complete processing. In addition, the processing time to convert the image is decreased by eliminating the steps of converting the DCT coefficients to pixel values, processing the pixel values and $$F_{ij}(u,v) = \tag{7}$$

$$\frac{4}{N^2}c(u)c(v)\cdot\sum_{i'}\sum_{j'}\sum_{w'=0}^{N-1}\sum_{v'=0}^{N-1}\sum_{x=0}^{N-1}\sum_{y=0}^{N-1}\sum_{m=0}^{N-1}\sum_{n=0}^{N-1}\alpha_{i',j',m,n}^{i,j,x,y}\cos\left[\frac{(2x+1)u\pi}{2N}\right]\cos\left[\frac{(2y+1)v\pi}{2N}\right]\cdot\cos\left[\frac{(2m+1)u'\pi}{2N}\right]\cos\left[\frac{(2n+1)v'\pi}{2N}\right]\cdot c(u')c(v')F'_{i'j'}(u',v')$$

Equation (7) can be rewritten as equations (8) and (9):

then converting the processed pixel values back to DCT $$F_{ij}(u,v) = \sum_{i'}\sum_{j'}\sum_{w'=0}^{N-1}\sum_{v'=0}^{N-1} PCV_{i',j',u',v'}^{i,j,u,v}\cdot F'_{i'j'}(u',v') \tag{8}$$

where:

$$PCV_{i',j',u',v'}^{i,j,u,v} = \frac{4}{N^2}\cdot c(u)c(v)c(u')c(v')\cdot\sum_{x=0}^{N-1}\sum_{y=0}^{N-1}\sum_{m=0}^{N-1}\sum_{n=0}^{N-1}\alpha_{i',j',m,n}^{i,j,x,y}\cos\frac{(2x+1)u\pi}{2N}\cos\frac{(2y+1)v\pi}{2N}\cdot\cos\frac{(2m+1)u'\pi}{2N}\cos\frac{(2n+1)v'\pi}{2N} \tag{9}$$

m and n are spatial coordinates of the original pixel values $f'_{i'j'}(m,n)$ in the pixel domain and $m,n=0,\ldots,N$, x and y are spatial coordinates of converted pixel values $f_{ij}(x,y)$ in the pixel domain and $x,y=0,\ldots,N-1$, u' and v' are coordinates in the spatial frequency domain of the original DCT coefficient values $F'_{i'j'}(u',v')$ and $u',v'=0, 1, 2, \ldots N-1$; u and v are coordinates in the spatial frequency domain of the converted DCT coefficient values $F_{ij}(u,v)$ and $u,v=0, 1, 2 \ldots N-1$; and $\alpha$ is the conversion coefficient.

Exemplary values for the conversion coefficient $\alpha$ are shown in Tables 1–6 below for converting six macroblocks, arranged as three by two macroblocks, into one macroblock and as described below. Since each value, x, y, m, n, u, v, u', v', and $\alpha$ in equation (9) is a known constant, the pre-computed values PCV can be calculated using equation (9) independent of the original DCT coefficients values $F'_{i'j'}(u',v')$ to be converted. The calculation of the pre-computed value PCV does not depended upon the original DCT coefficient values $F'_{i'j'}(u',v')$ or the converted DCT coefficient values $F_{ij}(u,v)$. The pre-computed values PCV are used to convert any original DCT coefficient values $F'_{i'j'}(u',v')$ to converted coefficient values $F_{ij}(u,v)$ for a conversion of six macroblocks, arranged as three by two macroblocks, into one converted macroblock.

As described above, the converted DCT coefficient values $F_{ij}(u,v)$ correspond to an image having a different resolution than the image represented by the original DCT coefficient values $F'_{i'j'}(u',v')$. Therefore, the resolution of an image can be changed by mapping the original DCT coefficient values $F'_{i'j'}(u',v')$ to the converted DCT coefficient values $F_{ij}(u,v)$.

coefficients. Finally, the converted image produced by this method has fewer artifacts than an image that has been converted into the pixel domain, interpolated, and then converted back into the spatial frequency domain.

DESCRIPTION OF EXEMPLARY DCT CONVERTER

Figure 6:
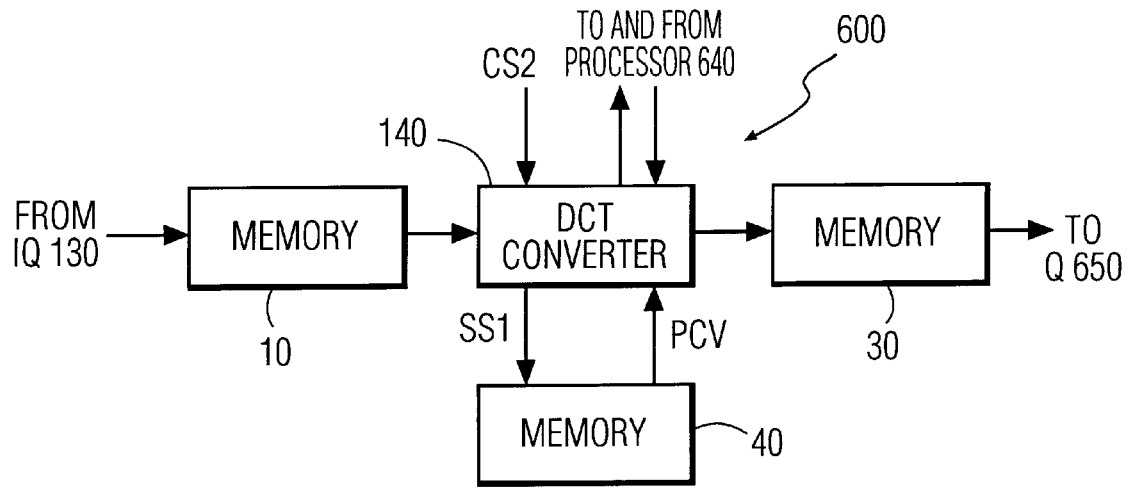
FIG. 6 is a block diagram of a DCT conversion apparatus in accordance with an exemplary embodiment of the present invention.
Figure 7A:
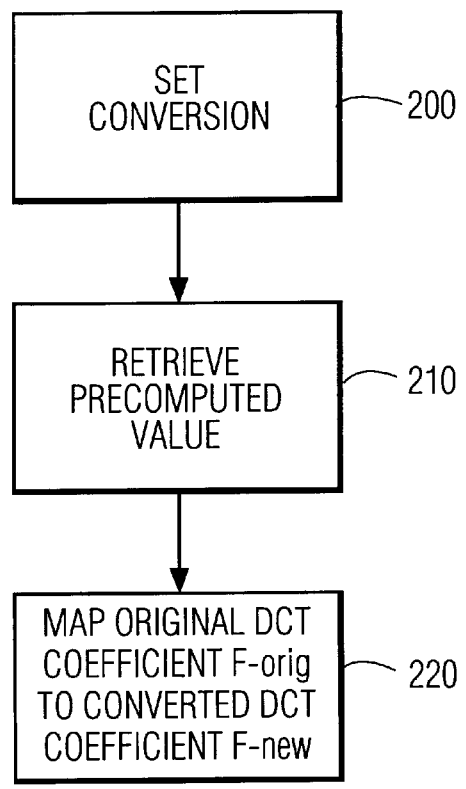
FIGS. 7(a) and 7(b) are flow chart diagrams illustrating the operation of the DCT converter 140 shown in FIG. 6 in accordance with an exemplary embodiment of the present invention.

FIG. 6 illustrates the overall organization of a DCT conversion apparatus 600 which maps original DCT coefficient values $F'_{i'j'}(u',v')$ to converted DCT coefficient values $F_{ij}(u,v)$ in the spatial frequency domain in accordance with an exemplary embodiment of the present invention. The DCT conversion apparatus 600 either reduces or increases the number of original DCT coefficient values $F'_{i'j'}(u',v')$.

As shown in FIG. 6, encoded image data represented by original DCT coefficient values $F'_{i'j'}(u',v')$ are stored in memory 10. The encoded image data is, for example, a MP@HL or MP@ML encoded image. The original DCT coefficient values $F'_{i'j'}(u',v')$ are arranged in macroblocks and are not quantised. The original DCT coefficient values $F'_{i'j'}(u',v')$ are provided to DCT converter 140 which maps the original DCT coefficients $F'_{i'j'}(u',v')$ into converted coefficient values ($F_{ij}(u,v)$ that represent a reduced-resolution image or an increased resolution image. For example, when the input bit-stream is converted from MP@HL to MP@ML, the number of DCT coefficients is reduced. When the input bit-stream is converted from MP@ML to MP@HL, the number of DCT coefficients is increased. The converted DCT coefficients are stored in memory 30. DCT converter 140 is described in greater detail below.

DCT converter 140 maps the original DCT coefficient values $F'_{i'j'}(u',v')$ to the converted coefficient values $F_{ij}(u,v)$ in response to a control signal CS2 which specifies the change in resolution of the image i.e.—converting a 1920 by 1080 interlaced image to a 640 by 540 interlaced image. In response to the control signal CS2, original DCT coefficient values $F'_{i'j'}(u',v')$ are retrieved from memory 10 and pre-computed values PCV stored in memory 40 are retrieved in response to select signal SS1. Memory 40 is, for example, a random access memory or a read only memory.

The pre-computed values PCV, as described above, can be calculated independent of the original DCT coefficient values $F'_{i'j'}(u',v')$. The pre-computed values PCV are stored in memory 40 prior to converting the original DCT coefficient values $F'_{i'j'}(u',v')$ to converted DCT coefficient values $F_{ij}(u,v)$. The pre-computed values PCV are retrieved from memory 40 as described below. As shown in equation (8) and described in greater detail below, the original DCT coefficient values $F'_{i'j'}(u',v')$ are multiplied by corresponding pre-computed values PCV and summed to produce converted coefficient values $F_{ij}(u,v)$ in the spatial frequency domain.

The DCT converter 140 is described in greater detail with reference to FIGS. 7–9. First, at step 200 shown in FIG. 7(*a*), the DCT converter 140 is set in response to control signal CS2 to convert the original DCT coefficient values $F'_{i'j'}(u',v')$ in the spatial frequency domain. Control signal CS2 specifies the change in resolution of the image to be converted.

The original DCT coefficient values $F'_{i'j'}(u',v')$ are contained in macroblocks. FIG. 8(*a*) is a data structure diagram illustrating six macroblocks MB0–MB5 which constitute a portion of an image to be converted. As shown in FIG. 8(*b*), each macroblock MB0–MB5 comprises six blocks: four luminance blocks b0–b3 and two chrominance blocks b4 and b5. This format is identified as 4:2:0 in the MPEG-2 standard.

As shown in FIG. 5(*c*). each block of the blocks b0–b5 contains sixty-four DCT coefficients assigned an address value z1 of zero to sixty-three. Alternatively, the address value could be specified by the spatial coordinates u', v' of the original DCT coefficient values $F'_{i'j'}(u',v')$. Each of the converted DCT coefficient values $F_{ij}(u,v)$ also contains sixty-four DCT coefficients, each assigned an address value z of zero to sixty-three. The original DCT coefficient values are retrieved from memory 10 by specifying the address value z1 of the original DCT coefficient value, the j'-th block which includes the original DCT coefficient value, and the i'-th macroblock which includes the j'-th block.

Figure 9:
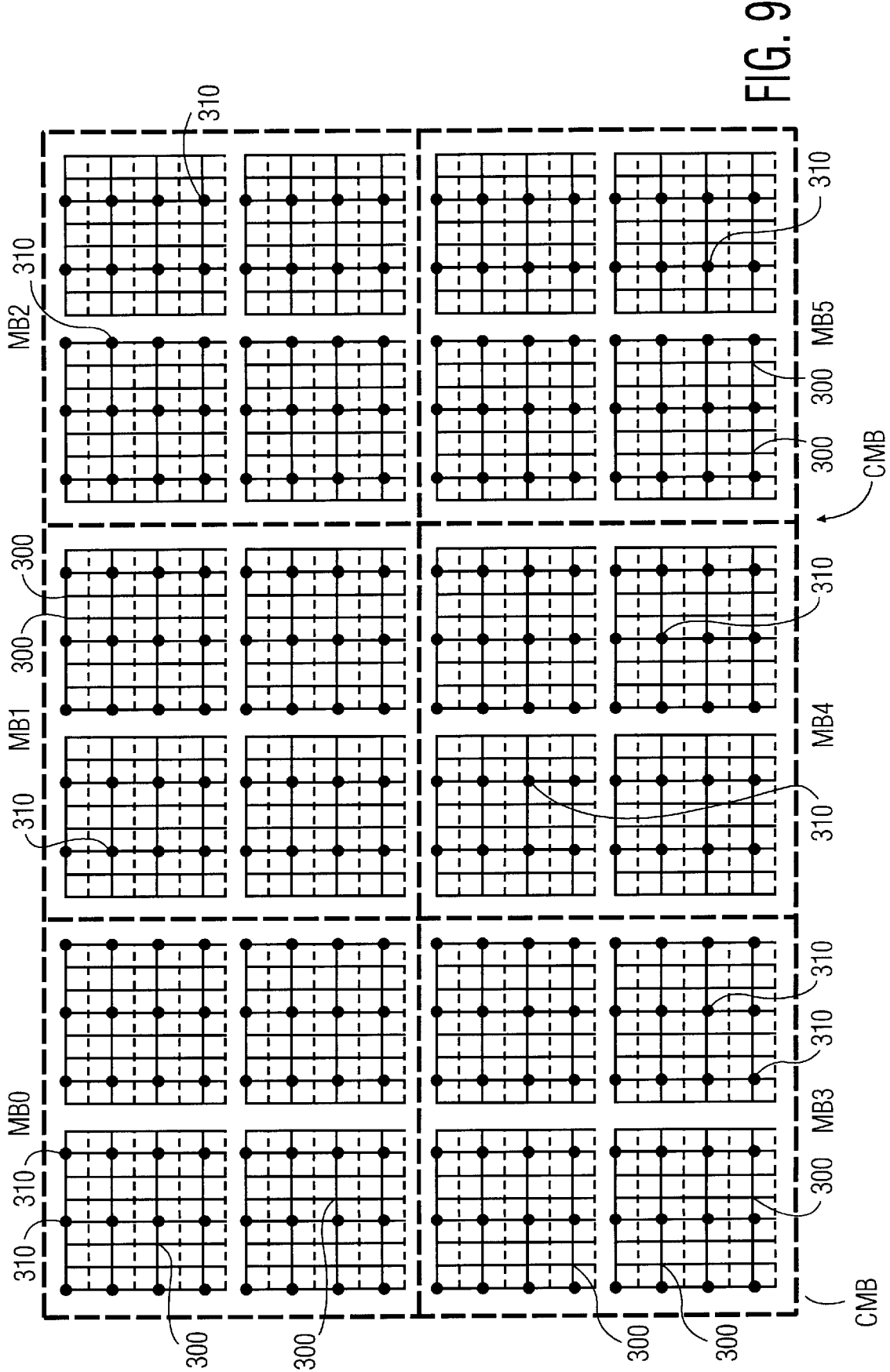
FIG. 9 is a data structure diagram illustrating the mapping of six macroblocks to one macroblock in the pixel domain.

The conversion of the macroblocks in FIG. 8(*a*) is shown in FIG. 9, where the image is represented by pixels in the pixel domain and arranged into macroblocks MB0–MB5 where the macroblocks are in frame format. Original pixel values f'i'j' (m,n) are located at each of the indices 300 and the converted pixel values $f_{ij}(u,v)$ are located at each of the indices 310 having a filled circle. In FIG. 9, the original image is 1920 by 1080 pixels and the converted image is 640 by 540 pixels. The original image is effectively horizontally decimated by three and effectively vertically decimated by two of produce an image having a 640 by 540 pixels resolution. The effective decimation factors for horizontal and vertical directions are determined in response to the control signal CS2. There is a corresponding set of pre-computed values PCV stored in memory 40 for each set of horizontal and vertical decimation factors $a_{i',j'm,n}^{i,j,x,y}$. As described above, the pre-computed values PCV are calculated using equation (9) and stored at respective memory locations in memory 40 shown in FIG. 6.

At step 210 as shown in FIG. 7(*a*), the pre-computed values PCV are retrieved from memory 40 and provided to DCT converter 140. The pre-computed values PCV are selected from memory 40 in response to the macroblock, block, and the address value of the original DCT coefficient values and the converted DCT coefficient values. The pre-computed values PCV are stored at an address in memory 40 specified by address signal SS1. Address signal SS1 provides the address of the pre-computed value PCV for converting the z1-th DCT coefficient value of the j'-th block of the i'-th original macroblock to the z-th DCT coefficient value of the j-th block of the converted macroblock. z1 is the address value of the original DCT coefficient value and z is the address value of the converted DCT coefficient value.

Next, at step 220, the converted coefficient values $F_{ij}(u,v)$ are produced using the original DCT coefficient values $F'_{i'j'}(u',v')$ and the pre-computed values PCV in accordance with equation (8). Table 1 below is exemplary C code for determining the converted coefficient values $F_{ij}(u,v)$ using the original DCT coefficient values $F'_{i'j'}(u',v')$ and pre-computed values PCV. In Table 1, the values are defined as:

J: designates the j-th block of the converted macroblock;

a: designates the z-th DCT coefficient values of the j-th block of the converted macroblock;

i1: designates the i'-th macroblock of the original macroblocks;

j1: designates the j'-th block of the i'-th original macroblock;

z1: designates the z1-th DCT coefficient value of the j'-th block of the i'-th original macroblock;

map[j][z][i1][j1][z1]: designates the pre-computed value PCV for converting between (1) the z-th DCT coefficient value of the j-th block of the converted macroblock and (2) the z1-th DCT coefficient value of the j'-th block of the i'-th original macroblock;

mb_old: designates the original macroblocks MB0–MB5;

mb_new: designates the converted macroblock; and dclip(): designates clipping the DCT coefficients in the range of [−2048, 2048].

TABLE 1

```
dct_mapping(mb_old, mb_new)
short mb_old[6][6][64];          /* 6 input MB's */
short mb_new[6][64];             /* 1 New output MB */
{
register double sum;
int j,j1,i1,z,z1;
int x, y;
                                 /* Y, luminance **/
for (j=0; j<4; j++) {            /* 4 DCT blocks */
```

TABLE 1-continued

```
for (z=0; z<64; z++) {              /* 8 by 8 output DCT
                                       coefficient for
                                       each block */
  sum = 0;
  for (i1=0; i1<6; i1++) {          /* 6 input MB's */
    for (j1=0; j1<4; j1++) {        /* 4 DCT blocks */
      for (z1=0; z1<64; z1++) {     /* 8 by 8 DCT
                                       coefficients */
        sum +=
          (map[j][z][i1][j1][z1]*mb_old[i1][j1][z1]);
      }
    }
  }
  mb_new[j][z] = dclip(sum);
}
}
                                    /* Chrominance Cr and
                                       Cb */
for (j=4; j<6; j++) {               /* one block for each
                                       Cr and Cb */
  for (z=0; z<64; z++) {            /* 8 by 8 output DCT
                                       coefficient for each
                                       block */
    sum = 0;
    for (i1=0; i1<6; i1++) {        /* 6 input MB's */
      for (z1=0; z1<64; z1++) {     /* 8 by 8 input
                                       DCT coefficient for
                                       each block */
        sum += (mapC [z][i1][z1]*mb_old [i1][j][z1]);
      }
    }
    mb_new[j][z] = dclip(sum);
  }
}
}
```

Figure 7B:
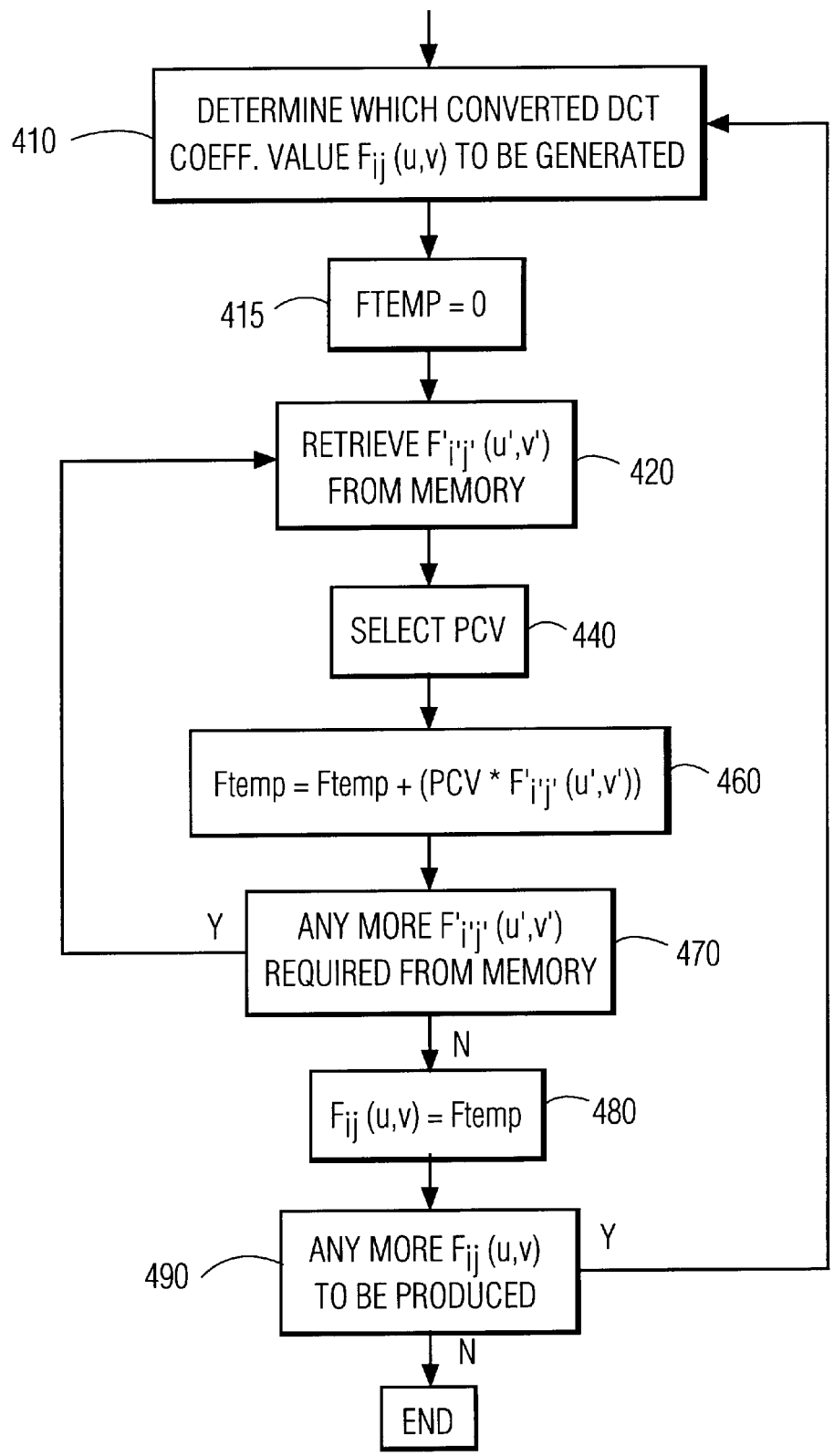

Steps 210 and 220 and the code in Table 1 are described with reference to the flow chart shown in FIG. 7(b). First, a step 410, it is determined which converted DCT coefficient value $F_{ij}(u,v)$ is to be produced. For a conversion from six macroblocks to one macroblock, sixty-four converted DCT coefficient values are produced. The converted DCT coefficient values are produced consecutively starting with the converted DCT coefficient value assigned an address value of zero to the last converted DCT coefficient value assigned an address value of sixty-three. Then, at step 415, the value Ftemp is set equal to zero. This variable will accumulate the converted coefficient value $F_{ij}(u,v)$.

Next, at step 420, an original DCT coefficient value $F'_{i'j'}(u',v')$ is retrieved from memory 10 shown in FIG. 6. DCT converter 140, shown in FIG. 6, maintains an address for each of the original DCT coefficient values $F'_{i'j'}(u',v')$ stored in memory 40. The address is specified by the address value z1, the block value j1, and the macroblock value i1 for the original DCT coefficient values $F'_{i'j'}(u',v')$. The address value z1 identifies one of the original DCT coefficient values $F'_{i'j'}(u',v')$, the value j1 specifies from which block the original DCT coefficient values $F'_{i'j'}(u',v')$ are retrieved, and the value i1 specifies from which macroblock the original DCT coefficient values $F'_{i'j'}(u',v')$ are retrieved. The addresses for retrieving the original DCT coefficient values $F'_{i'j'}(u',v')$ from memory 40 are produced by DCT converter 140.

DCT converter 140 determines which original DCT coefficient values $F'_{i'j'}(u',v')$ are retrieved in accordance with the original DCT coefficient value $F'_{i'j'}(u',v')$ specified in equation (8) and used to calculate the next converted DCT coefficient values $F_{ij}(u,v)$ determined at step 410.

For example, as shown in the code above in Table 1, the luminance macroblock for the converted macroblock is produced from each of the DCT coefficient values $F'_{i'j'}(u',v')$ in each of the original six macroblocks. The original DCT coefficients $F'_{i'j'}(u',v')$ are consecutively retrieved from the first block in the first original macrolock. That is, each time step 420 is repeated, the next consecutive original DCT coefficient value is retrieved. Once all of the original DCT coefficients $F'_{i'j'}(u',v')$ are retrieved from the first block, the original DCT coefficient values $F'_{i'j'}(u',v')$ in the next block in the first macroblock are retrieved. Once all of the original DCT coefficients $F'_{i'j'}(u',v')$ in the first macroblock have been retrieved, original DCT coefficient values are retrieved from the first block of the next macroblock. This process is repeated until all of the original DCT coefficient values $F'_{i'j'}(u',v')$ in each of the macroblocks have been retrieved.

Next, at step 440, DCT converter selects pre-computed values PCV from memory 40. As shown in the code of Table 1, the values z, j, z1, j1, and i1 are also used to determine which pre-computed values are retrieved from memory 40. As described above, there is a pre-computed value PCV stored in memory for mapping between the z-th converted DCT coefficient of the j-th block of the converted macroblock and the z1-th original DCT coefficient of the j1-block of the i1-th macroblock. The pre-computed values are calculated using the valve α shown in Tables 2–7 below as described above and shown in equation (9).

Table 2 includes the values α used to convert luminance block b0, Table 3 includes the values α used to convert luminance block b1, Table 4 includes the values α used to convert luminance block b2, Table 5 includes the values α used to convert luminance block b3, Table 6 includes the values α used to convert chrominance block b4, and Table 7 includes the values α used to convert chrominance block b5. The pre-computed values PCV are generated from the values α in Tables 2–7 using equation (9).

TABLE 2

| | |
|---|---|
| $\alpha^{0,0,x,y}_{0,0,3x,2y} = 1$ | for $x < 3$, $y < 4$ and even |
| $\alpha^{0,0,x,y}_{0,0,3x,2y-1} = \frac{1}{2}$ | for $x < 3$, $y < 4$ and odd |
| $\alpha^{0,0,x,y}_{0,0,3x,2y+1} = \frac{1}{2}$ | for $x < 3$, $y < 4$ and odd |
| $\alpha^{0,0,x,y}_{0,1,3(x-3)+1,2y} = 1$ | for $3 <= x < 6$, and $y < 4$ and even |
| $\alpha^{0,0,x,y}_{0,1,3(x-3)+1,2y-1} = \frac{1}{2}$ | for $3 <= x < 6$, and $y < 4$ and odd |
| $\alpha^{0,0,x,y}_{0,1,3(x-3)+1,2y+1} = \frac{1}{2}$ | for $3 <= x < 6$, and $y < 4$ and odd |
| $\alpha^{0,0,x,y}_{1,0,3(x-6)+2,2y} = 1$ | for $x >= 6$, and $y < 4$ and even |
| $\alpha^{0,0,x,y}_{1,0,3(x-6)+2,2y-1} = \frac{1}{2}$ | for $x >= 6$, and $y < 4$ and odd |
| $\alpha^{0,0,x,y}_{1,0,3(x-6)+2,2y+1} = \frac{1}{2}$ | for $x >= 6$, and $y < 4$ and odd |

TABLE 2-continued

| | |
|---|---|
| $\alpha_{0,2,3x,2(y-4)}^{0,0,x,y} = 1$ | for x < 3, y >= 4 and even |
| $\alpha_{0,2,3x,2(y-4)-1}^{0,0,x,y} = \frac{1}{2}$ | for x < 3, y >= 4 and odd |
| $\alpha_{0,2,3x,2(y-4)+1}^{0,0,x,y} = \frac{1}{2}$ | for x < 3, y >= 4 and odd |
| $\alpha_{0,3,3(x-3)+1,2(y-4)}^{0,0,x,y} = 1$ | for 3 <= x < 6, and y >= 4 and even |
| $\alpha_{0,3,3(x-3)+1,2(y-4)-1}^{0,0,x,y} = \frac{1}{2}$ | for 3 <= x < 6, and y >= 4 and odd |
| $\alpha_{0,3,3(x-3)+1,2(y-4)+1}^{0,0,x,y} = \frac{1}{2}$ | for 3 <= x < 6, and y >= 4 and odd |
| $\alpha_{1,2,3(x-6)+2,2(y-4)}^{0,0,x,y} = 1$ | for x >= 6, and y >= 4 and even |
| $\alpha_{1,2,3(x-6)+2,2(y-4)-1}^{0,0,x,y} = \frac{1}{2}$ | for x >= 6, and y >= 4 and odd |
| $\alpha_{1,2,3(x-6)+2,2(y-4)+1}^{0,0,x,y} = \frac{1}{2}$ | for x >= 6, and y >= 4 and odd |

TABLE 3

| | |
|---|---|
| $\alpha_{1,1,3x,2y}^{0,1,x,y} = 1$ | for x < 3, y >= 4 and even |
| $\alpha_{1,1,3x,2y-1}^{0,1,x,y} = \frac{1}{2}$ | for x > 3, y >= 4 and odd |
| $\alpha_{1,1,3x,2y+1}^{0,1,x,y} = \frac{1}{2}$ | for x > 3, y >= 4 and odd |
| $\alpha_{2,0,3(x-3)+1,2y}^{0,1,x,y} = 1$ | for 3 <= x < 6, and y >= 4 and even |
| $\alpha_{2,0,3(x-3)+1,2y-1}^{0,1,x,y} = \frac{1}{2}$ | for 3 <= x < 6, and y >= 4 and odd |
| $\alpha_{2,0,3(x-3)+1,2y+1}^{0,1,x,y} = \frac{1}{2}$ | for 3 <= x < 6, and y >= 4 and odd |
| $\alpha_{2,1,3(x-6)+2,2y}^{0,1,x,y} = 1$ | for x >= 6, and y >= 4 and even |
| $\alpha_{2,1,3(x-6)+2,2y-1}^{0,1,x,y} = \frac{1}{2}$ | for x >= 6, and y >= 4 and odd |
| $\alpha_{2,1,3(x-6)+2,2y+1}^{0,1,x,y} = \frac{1}{2}$ | for x >= 6, and y >= 4 and odd |
| $\alpha_{1,3,3x,2(y-4)}^{0,1,x,y} = 1$ | for x < 3, y >= 4 and even |
| $\alpha_{1,3,3x,2(y-4)-1}^{0,1,x,y} = \frac{1}{2}$ | for x > 3, y >= 4 and odd |
| $\alpha_{1,3,3x,2(y-4)+1}^{0,1,x,y} = \frac{1}{2}$ | for x > 3, y >= 4 and odd |
| $\alpha_{2,2,3(x-3)+1,2(y-4)}^{0,1,x,y} = 1$ | for 3 <= x < 6, and y >= 4 and even |

TABLE 3-continued

| | |
|---|---|
| $\alpha_{2,2,3(x-3)+1,2(y-4)-1}^{0,1,x,y} = \frac{1}{2}$ | for 3 <= x < 6, and y >= 4 and odd |
| $\alpha_{2,2,3(x-3)+1,2(y-4)+1}^{0,1,x,y} = \frac{1}{2}$ | for 3 <= x < 6, and y >= 4 and odd |
| $\alpha_{2,3,3(x-6)+2,2(y-4)}^{0,1,x,y} = 1$ | for x >= 6, and y >= 4 and even |
| $\alpha_{2,3,3(x-6)+2,2(y-4)-1}^{0,1,x,y} = \frac{1}{2}$ | for x >= 6, and y >= 4 and odd |
| $\alpha_{2,3,3(x-6)+2,2(y-4)+1}^{0,1,x,y} = \frac{1}{2}$ | for x >= 6, and y >= 4 and odd |

TABLE 4

| | |
|---|---|
| $\alpha_{3,0,3x,2y}^{0,2,x,y} = 1$ | for x < 3, y < 4 and even |
| $\alpha_{3,0,3x,2y-1}^{0,2,x,y} = \frac{1}{2}$ | for x < 3, y < 4 and odd |
| $\alpha_{3,0,3x,2y+1}^{0,2,x,y} = \frac{1}{2}$ | for x < 3, y < 4 and odd |
| $\alpha_{3,1,3(x-3)+1,2y}^{0,2,x,y} = 1$ | for 3 <= x < 6, and y < 4 and even |
| $\alpha_{3,1,3(x-3)+1,2y-1}^{0,2,x,y} = \frac{1}{2}$ | for 3 <= x < 6, and y < 4 and odd |
| $\alpha_{3,1,3(x-3)+1,2y+1}^{0,2,x,y} = \frac{1}{2}$ | for 3 <= x < 6, and y < 4 and odd |
| $\alpha_{4,0,3(x-6)+2,2y}^{0,2,x,y} = 1$ | for x >= 6, and y < 4 and even |
| $\alpha_{4,0,3(x-6)+2,2y-1}^{0,2,x,y} = \frac{1}{2}$ | for x >= 6, and y < 4 and odd |
| $\alpha_{4,0,3(x-6)+2,2y+1}^{0,2,x,y} = \frac{1}{2}$ | for x >= 6, and y < 4 and odd |
| $\alpha_{3,2,3x,2(y-4)}^{0,2,x,y} = 1$ | for x < 3, y >= 4 and even |
| $\alpha_{3,2,3x,2(y-4)-1}^{0,2,x,y} = \frac{1}{2}$ | for x < 3, y >= 4 and odd |
| $\alpha_{3,2,3x,2(y-4)+1}^{0,2,x,y} = \frac{1}{2}$ | for x < 3, y >= 4 and odd |
| $\alpha_{3,3,3(x-3)+1,2(y-4)}^{0,2,x,y} = 1$ | for 3 <= x < 6, and y >= 4 and even |
| $\alpha_{3,3,3(x-3)+1,2(y-4)-1}^{0,2,x,y} = \frac{1}{2}$ | for 3 <= x < 6, and y >= 4 and odd |
| $\alpha_{3,3,3(x-3)+1,2(y-4)+1}^{0,2,x,y} = \frac{1}{2}$ | for 3 <= x < 6, and y >= 4 and odd |

TABLE 4-continued $\alpha^{0,2,x,y}_{4,2,3(x-6)+2,2(y-4)} = 1$ for x >= 6, and y >= 4 and even $\alpha^{0,2,x,y}_{4,2,3(x-6)+2,2(y-4)-1} = \frac{1}{2}$ for x >= 6, and y >= 4 and odd $\alpha^{0,2,x,y}_{4,2,3(x-6)+2,2(y-4)+1} = \frac{1}{2}$ for x >= 6, and y >= 4 and odd

TABLE 5

$\alpha^{0,3,x,y}_{4,1,3x,2y} = 1$ for x < 3, y < 4 and even $\alpha^{0,3,x,y}_{4,1,3x,2y-1} = \frac{1}{2}$ for x < 3, y < 4 and odd $\alpha^{0,3,x,y}_{4,1,3x,2y+1} = \frac{1}{2}$ for x < 3, y < 4 and odd $\alpha^{0,3,x,y}_{5,0,3(x-3)+1,2y} = 1$ for 3 <= x < 6, and y < 4 and even $\alpha^{0,3,x,y}_{5,0,3(x-3)+1,2y-1} = \frac{1}{2}$ for 3 <= x < 6, and y < 4 and odd $\alpha^{0,3,x,y}_{5,0,3(x-3)+1,2y+1} = \frac{1}{2}$ for 3 <= x < 6, and y < 4 and odd $\alpha^{0,3,x,y}_{5,1,3(x-6)+2,2y} = 1$ for x >= 6, and y < 4 and even $\alpha^{0,3,x,y}_{5,1,3(x-6)+2,2y-1} = \frac{1}{2}$ for x >= 6, and y < 4 and odd $\alpha^{0,3,x,y}_{5,1,3(x-6)+2,2y+1} = \frac{1}{2}$ for x >= 6, and y < 4 and odd $\alpha^{0,3,x,y}_{4,2,3x,2(y-4)} = 1$ for x < 3, y >= 4 and even $\alpha^{0,3,x,y}_{4,2,3x,2(y-4)-1} = \frac{1}{2}$ for x < 3, y >= 4 and odd $\alpha^{0,3,x,y}_{4,2,3x,2(y-4)+1} = \frac{1}{2}$ for x < 3, y >= 4 and odd $\alpha^{0,3,x,y}_{5,2,3(x-3)+1,2(y-4)} = 1$ for 3 <= x < 6, and y >= 4 and even $\alpha^{0,3,x,y}_{5,2,3(x-3)+1,2(y-4)-1} = \frac{1}{2}$ for 3 <= x < 6, and y >= 4 and odd $\alpha^{0,3,x,y}_{5,2,3(x-3)+1,2(y-4)+1} = \frac{1}{2}$ for 3 <= x < 6, and y >= 4 and odd $\alpha^{0,3,x,y}_{5,3,3(x-6)+2,2(y-4)} = 1$ for x >= 6, and y >= 4 and even $\alpha^{0,3,x,y}_{5,3,3(x-6)+2,2(y-4)-1} = \frac{1}{2}$ for x >= 6, and y >= 4 and odd $\alpha^{0,3,x,y}_{5,3,3(x-6)+2,2(y-4)+1} = \frac{1}{2}$ for x >= 6, and y >= 4 and odd

TABLE 6

$\alpha^{0,4,x,y}_{0,4,3x,2y} = 1$ for x < 3, y < 4 and even $\alpha^{0,4,x,y}_{0,4,3x,2y-1} = \frac{1}{2}$ for x < 3, y < 4 and odd $\alpha^{0,4,x,y}_{0,4,3x,2y+1} = \frac{1}{2}$ for x < 3, y < 4 and odd $\alpha^{0,4,x,y}_{1,4,3(x-3)+1,2y} = 1$ for 3 <= x < 6, and y < 4 and even $\alpha^{0,4,x,y}_{1,4,3(x-3)+1,2y-1} = \frac{1}{2}$ for 3 <= x < 6, and y < 4 and odd $\alpha^{0,4,x,y}_{1,4,3(x-3)+1,2y+1} = \frac{1}{2}$ for 3 <= x < 6, and y < 4 and odd $\alpha^{0,4,x,y}_{2,4,3(x-6)+2,2y} = 1$ for x >= 6, and y < 4 and even $\alpha^{0,4,x,y}_{2,4,3(x-6)+2,2y-1} = \frac{1}{2}$ for x >= 6, and y < 4 and odd $\alpha^{0,4,x,y}_{2,4,3(x-6)+2,2y+1} = \frac{1}{2}$ for x >= 6, and y < 4 and odd $\alpha^{0,4,x,y}_{3,4,3x,2(y-4)} = 1$ for x < 3, y >= 4 and even $\alpha^{0,4,x,y}_{3,4,3x,2(y-4)-1} = \frac{1}{2}$ for x < 3, y >= 4 and odd $\alpha^{0,4,x,y}_{3,4,3x,2(y-4)+1} = \frac{1}{2}$ for x < 3, y >= 4 and odd $\alpha^{0,4,x,y}_{4,4,3(x-3)+1,2,(y-4)} = 1$ for 3 <= x < 6, and y >= 4 and even $\alpha^{0,4,x,y}_{4,4,3(x-3)+1,2(y-4)-1} = \frac{1}{2}$ for 3 <= x < 6, and y >= 4 and odd $\alpha^{0,4,x,y}_{4,4,3(x-3)+1,2(y-4)+1} = \frac{1}{2}$ for 3 <= x < 6, and y >= 4 and odd $\alpha^{0,4,x,y}_{5,4,3(x-6)+2,2(y-4)} = 1$ for x >= 6, and y >= 4 and even $\alpha^{0,4,x,y}_{5,4,3(x-6)+2,2(y-4)-1} = \frac{1}{2}$ for x >= 6, and y >= 4 and odd $\alpha^{0,4,x,y}_{5,4,3(x-6)+2,2(y-4)+1} = \frac{1}{2}$ for x >= 6, and y >= 4 and odd

TABLE 7

$\alpha^{0,5,x,y}_{0,5,3x,2y} = 1$ for x < 3, y < 4 and even $\alpha^{0,5,x,y}_{0,5,3x,2y-1} = \frac{1}{2}$ for x < 3, y < 4 and odd $\alpha^{0,5,x,y}_{0,5,3x,2y+1} = \frac{1}{2}$ for x < 3, y < 4 and odd $\alpha^{0,5,x,y}_{1,5,3(x-3)+1,2y} = 1$ for 3 <= x < 6, and y < 4 and even

TABLE 7-continued

| | | |
|---|---|---|
| $\alpha^{0,5,x,y}_{1,5,3(x-3)+1,2y-1} = \frac{1}{2}$ | for 3 <= x < 6, and y < 4 and odd |
| $\alpha^{0,5,x,y}_{1,5,3(x-3)+1,2y+1} = \frac{1}{2}$ | for 3 <= x < 6, and y < 4 and odd |
| $\alpha^{0,5,x,y}_{2,5,3(x-6)+2,2y} = 1$ | for x >= 6, and y < 4 and even |
| $\alpha^{0,5,x,y}_{2,5,3(x-6)+2,2y-1} = \frac{1}{2}$ | for x >= 6, and y < 4 and odd |
| $\alpha^{0,5,x,y}_{2,5,3(x-6)+2,2y+1} = \frac{1}{2}$ | for x >= 6, and y < 4 and odd |
| $\alpha^{0,5,x,y}_{3,5,3x,2(y-4)} = 1$ | for x < 3, y >= 4 and even |
| $\alpha^{0,5,x,y}_{3,5,3x,2(y-4)-1} = \frac{1}{2}$ | for x < 3, y >= 4 and odd |
| $\alpha^{0,5,x,y}_{3,5,3x,2(y-4)+1} = \frac{1}{2}$ | for x < 3, y >= 4 and odd |
| $\alpha^{0,5,x,y}_{4,5,3(x-3)+1,2(y-4)} = 1$ | for 3 <= x < 6, and y >= 4 and even |
| $\alpha^{0,5,x,y}_{4,5,3(x-3)+1,2(y-4)-1} = \frac{1}{2}$ | for 3 <= x < 6, and y >= 4 and odd |
| $\alpha^{0,5,x,y}_{4,5,3(x-3)+1,2(y-4)+1} = \frac{1}{2}$ | for 3 <= x < 6, and y >= 4 and odd |
| $\alpha^{0,5,x,y}_{5,5,3(x-6)+2,2(y-4)} = 1$ | for x >= 6, and y >= 4 and even |
| $\alpha^{0,5,x,y}_{5,5,3(x-6)+2,2(y-4)-1} = \frac{1}{2}$ | for x >= 6, and y >= 4 and odd |
| $\alpha^{0,5,x,y}_{5,5,3(x-6)+2,2(y-4)+1} = \frac{1}{2}$ | for x >= 6, and y >= 4 and odd |

Figure 10A:
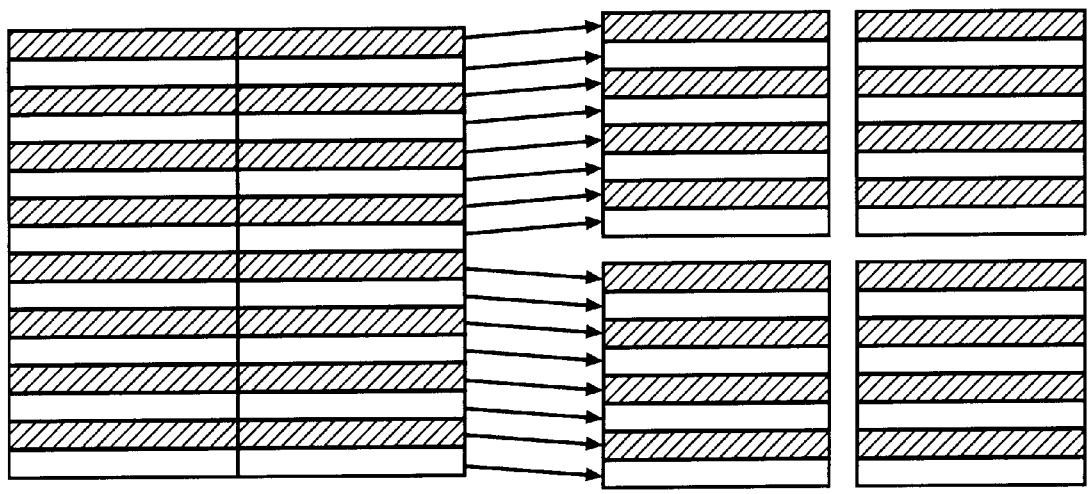
FIGS. 10(a) and 10(b) are data structure diagrams which illustrate the luminance macroblock structure in frame DCT coding and the luminance macroblock structure in field DCT coding for a 4:2:0 block format.
Figure 10B:
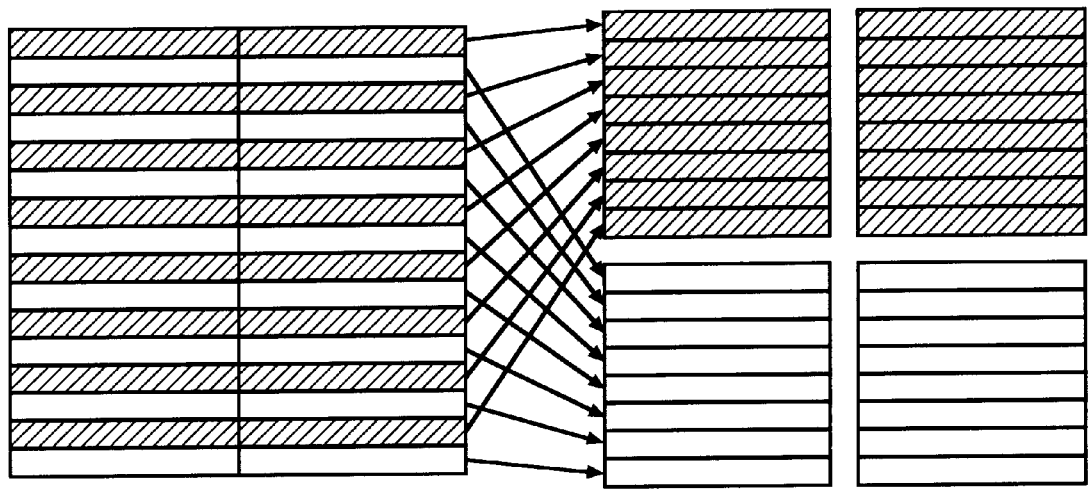

The pre-computed values PCV calculated from the values α in Tables 2 to 7 are for a frame to frame DCT conversion of the DCT coefficient values. FIGS. 10(a) and 10(b) illustrate the luminance macroblock structure in frame DCT coding and the luminance macroblock structure in field DCT coding, respectively, for a 4:2:0 block format. In a frame coded macroblock, each block, b0–b3, is composed of two fields alternatively. In a field coded macroblock, each block, b0–b3, is composed of lines from one of two fields. The chrominance macroblocks for each format are organized in frame format. The pre-computed values are for converting a set of frame coded macroblocks to a single frame coded macroblock. Pre-computed values could also be provided for converting a set of field coded macroblocks to a single field coded macroblock. It is advantageous to provide pre-computed values for one type, frame to frame or field to field, conversion to reduce the size of the memory used to store the coefficients.

Alternatively, the pre-computed values PCV can be calculated from the values α by DCT converter 140. Table 8 below is pseudo code for calculating the pre-computed values from the values α.

TABLE 8

```
10  if x <= N-1 then
       y = 0
20     of y <= N-1 then
         m = 0
30       if m <= N-1 then
           n = 0
40         if n <= N-1 then
```

$$TMP = \alpha[i][j][m][n] \cdot \cos\frac{(2x+1)u\pi}{2N} \cdot \cos\frac{(2y+1)v\pi}{2N} \cdot \cos\frac{(2m+1)u'\pi}{2N} \cdot \cos\frac{(2y+1)v'\pi}{2N}$$

```
           PCV = PCV + TMP
           n = n+1
           goto 40
         else m = m + 1; goto 30
       else y = y + 1; goto 20
     else x = x +1
   else end
```

In this alternative embodiment, the values α are stored in memory 40. The values α are retrieved from memory 40 and the pre-computed values PCV are calculated by converter 140 using the pseudo code in Table 8.

Next, at step 460, a temporary value Ftemp is calculated by adding the previous temporary values Ftemp to the retrieved original DCT coefficient value multiplied by the pre-computed value PCV. Since converted coefficient values $F_{ij}(u',v')$, can be generated from a number of original coefficient values $F'_{ij}(u',v')$, it is next determined, at step 470, if any more original coefficient values $F'_{ij}(u',v')$ are required to produce the selected converted coefficient value ($F_{ij}(u,v)$). If additional original coefficient values $F'_{ij}(u',v')$ are required, step 420 is repeated. Otherwise, at step 480, the converted coefficient value $F_{ij}(u,v)$ is set equal to the value Ftemp. Then, at step 490, it is determined if any more converted coefficient values $F_{ij}(u,v)$ of the converted macroblock are to be produced. If more converted coefficient values $F_{ij}(u,v)$ are to be produced, then, step 410 is repeated.

As a result, converted DCT coefficient values $F_{ij}(u,v)$ can be generated from original DCT coefficient values $F'_{ij}(u',v')$ in the spatial frequency domain rapidly and without converting the DCT coefficient values to pixels values.

Although the above exemplary embodiment of the present invention discusses the use of direct DCT mapping to effectively decimate or interpolate an MPEG coded signal, direct mapping of coefficient values can be applied to any system which requires the decimation or interpolation of a signal in the pixel domain by directly mapping the signal represented by transform coefficients in the spatial frequency domain.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for generating format and control data for at least one converted macroblock which represents a plurality of original macroblocks, where the original macroblocks include both intra coded and non-intra coded macroblocks, the apparatus comprising:

determining means for analyzing the intra coded and non-intra coded original macroblocks to determine whether (1) a majority of the original macroblocks are non-intra coded or (2) the majority of the original macroblocks are intra coded;

first designating means for designating the converted macroblock non-intra coded if the majority of the original macroblocks are determined to be non-intra coded; and second designating means for designating the converted macroblock intra coded if the majority of the original macroblocks are determined to be intra coded.

2. The apparatus according to claim 1, wherein each the non-intra coded original macroblocks has a prediction type of P-coded or B-coded, and wherein the apparatus further comprises:

third designating means for designating the prediction type of the converted non-intra coded macroblock (1) P-coded if a majority of the non-intra coded original macroblocks are determined to be P-coded or (2) B-coded if the majority of the non-intra coded original macroblocks are determined to be B-coded.

3. The apparatus according to claim 2, wherein each of the original macroblocks has a motion type of field format or frame format and wherein the apparatus further comprises:

means for selecting a first macroblock group as (1) the original macroblocks which are P-coded if the converted macroblock is designated P-coded or (2) the original macroblocks which are B-coded if the converted macroblock is designated B-coded; and fourth designating means for designating the motion type of the converted macroblock as (1) field format if a majority of the selected macroblocks are in field format or (2) frame format if a majority of the selected macroblocks are in frame format.

4. An apparatus for generating format and control data for at least one converted macroblock which represents a plurality of original macroblocks, where the original macroblocks include both intra coded and non-intra coded macroblocks, each the non-intra coded original macroblocks has a prediction type of P-coded or B-coded and has a motion type of field format or frame format, the apparatus comprising:

determining means for analyzing the intra coded and non-intra coded original macroblocks to determine whether (1) a majority of the original macroblocks are non-intra coded or (2) the majority of the original macroblocks are intra coded;

first designating means for designating the converted macroblock non-intra coded if the majority of the original macroblocks are determined to be non-intra coded; and second designating means for designating the converted macroblock intra coded if the majority of the original macroblocks are determined to be intra coded;

third designating means for designating the prediction type of the converted non-intra coded macroblock (1) P-coded if a majority of the non-intra coded original macroblocks are determined to be P-coded or (2) B-coded if the majority of the non-intra coded original macroblocks are determined to be B-coded;

means for selecting a first macroblock group as (1) the original macroblocks which are P-coded if the converted macroblock is designated P-coded or (2) the original macroblocks which are B-coded if the converted macroblock is designated B-coded;

fourth designating means for designating the motion type of the converted macroblock as (1) field format if a majority of the selected macroblocks are infield format or (2) frame format if a majority of the selected macroblocks are in frame format;

means for selecting a second macroblock group as (1) the original macroblocks in the first macroblock group which are in field format if the converted macroblock is designated field format or (2) the original macroblocks in the first macroblock group which are in frame format of the converted macroblock is designated frame format;

means for selecting a motion vector from the second macroblock group as the converted motion vector; and means for scaling the converted motion vector.

5. The apparatus according to claim 4, further comprising:

means for determining whether a majority of the motion vectors of the second macroblock group are the same; and means for selecting one of the majority of motion vectors which are the same as the converted motion vector.

6. An apparatus for generating format and control data for at least one converted macroblock which represents a plurality of original macroblocks, wherein each of the original macroblocks contains coefficient values and the original macroblocks include both intra coded and non-intra coded macroblocks which represent an image, the apparatus comprising:

first determining means for analyzing the intra coded and non-intra coded original macroblocks to determine whether (1) a majority of the original macroblocks are non-intra coded or (2) the majority of the original macroblocks are intra coded;

first designated means for designating the converted macroblock non-intra coded if the majority of the original macroblocks are determined to be non-intra coded;

second designating means for designating the converted macroblock intra coded if the majority of the original macroblocks are determined to be intra coded; and converter means for directly converting the resolution of the image by mapping the coefficient values of the non-intra coded original macroblocks to a second plurality of coefficient values in the converted macroblock in the spatial frequency domain.

7. The apparatus according to claim 1, wherein each of the original macroblocks contains coefficient values and the original macroblocks represent an image, the apparatus further comprises:

converter means for directly converting the resolution of the image by mapping the coefficient values of the intra coded original macroblocks to a second plurality of coefficient values in the converted macroblock in the spatial frequency domain.

8. An apparatus for generating format and control data for at least one converted macroblock which represents a plurality of original macroblocks, where the original macroblocks include both intra coded and non-intra coded macroblocks and each of the original non-intra coded macroblocks has a motion type of field format or frame format and a prediction type of P-coded or B-coded, the apparatus comprising:

determining means for analyzing the intra coded and non-intra coded original macroblocks to determine whether (1) a majority of the original macroblocks are non-intra coded or (2) the majority of the original macroblocks are intra coded;

first designating means for designating the converted macroblock (1) non-intra coded if the majority of the original macroblocks are non-intra coded or (2) intra coded if the majority of the original macroblocks are intra coded;

second designating means for designating the prediction type of the converted non-intra coded macroblock (1) P-coded if a majority of the non-intra coded original macroblocks are P-coded or (2) B-coded if the majority of the non-intra coded original macroblocks are B-coded;

means for selecting a first macroblock group as (1) the original macroblocks which are P-coded if the converted are designated are P-coded or (2) the original macroblocks which are B-coded if the original macroblocks which are B-coded if the converted macroblock is designated B-coded; and third designating means for designating the motion type of the converted macroblock as (1) field format if a majority of the selected macroblocks are in field format or (2) frame format if a majority of the selected macroblocks are in frame format.

9. The apparatus according to claim 8, wherein each of the original macroblocks has a motion vector and the converted macroblock has a converted motion vector, the apparatus further comprising:

means for selecting a second macroblock group as (1) the original macroblocks in the first macroblock group which are in field format if the converted macroblock is designated field format or (2) the original macroblocks in the first macroblock group which are in frame format if the converted macroblock is designated frame format;

means for selecting a motion vector from the second macroblock group as the converted motion vector; and means for scaling the converted motion vector.

10. The apparatus according to claim 8, further comprising:

means for determining whether a majority of the motion vectors of the second macroblock group are the same; and means for selecting one of the majority of motion vectors which are the same as the converted motion vector.

11. The apparatus according to claim 8, wherein the P-coded macroblocks are forward prediction or backward prediction coded and the second signaling means comprises:

means for designating the prediction type of the converted macroblock as B-coded if there is not a majority of the non-intra coded original macroblocks which are P-coded or B-coded and at least one of the non-intra coded original macroblocks is B-coded;

means for designating the prediction type of the converted macroblock as P-coded, forward prediction, if (1) there is not a majority of the non-intra coded original macroblocks which are P-coded or B-coded, (2) none of the original macroblocks are B-coded, and (3) at least one of the non-intra coded original macroblocks are P-coded, forward prediction; and means for designating the prediction type of the converted macroblock as P-coded, backward prediction, if (1) there is not a majority of the non-intra coded original macroblocks which are P-coded or B-coded, (2) none of non-intra coded original macroblocks are B-coded, (3) none of the non-intra coded original macroblocks are P-coded, forward prediction, and (4) at least one of the non-intra coded original macroblocks are P-coded, backward prediction.

12. The apparatus according to claim 8, wherein the third designating means comprises means for designating the motion type of the converted macroblock as frame format if there is not a majority of the original macroblocks in the first macroblock group which are in frame format or field format.

13. The apparatus according to claim 8, wherein each of the original macroblocks contains coefficient values and the apparatus further comprises means for generating intermediate macroblocks by setting the coefficient values to zero for the original macroblocks which (1) are intra coded or (2) do not have the same motion type or prediction type as the converted macroblock.

14. The apparatus according to claim 12, wherein the original macroblocks represent an image, and the apparatus further comprises:

converter means for directly converting the resolution of the image by mapping the coefficient values of (1) the non-intra coded original macroblocks which have the same motion type and prediction type as the converted macroblock and (2) the intermediate macroblocks, to a second plurality of coefficient values in the converted macroblock in the spatial frequency domain.

15. The apparatus according to claim 8, wherein each of the original macroblocks contains coefficient values and the apparatus further comprises:

means for averaging the coefficient values of each of the intra coded original macroblocks to generate a respective average value for each one of the coefficient values for each one of non-intra coded original macroblocks when the converted macroblock is designated intra coded; and means for replacing the coefficient values of each of the non-intra coded original macroblocks with the respective average value to produce intermediate macroblocks.

16. The apparatus according to claim 15, wherein the original macroblocks represent an image, and the apparatus further comprises:

converter means for directly converting the resolution of the image by mapping the coefficient values of the intra coded original macroblocks and the intermediate macroblocks, to a second plurality of coefficient values in the converted macroblock in the spatial frequency domain.

17. An apparatus for generating format and control data for at least one converted macroblock from original macroblocks, where each of the original macroblocks is intra or non-intra coded and each of the original macroblocks contains coefficient values, the apparatus comprising:

means or designating the converted macroblock (1) non-intra coded if a majority of original macroblocks are non-intra coded or (2) intra coded if the majority of the original macroblocks are intra coded;

means for averaging the coefficient values of each of the intra coded original macroblocks to generate an average value for each one of the coefficients of the non-intra coded original macroblocks when the converted macroblock is designated intra coded; and means for replacing each coefficient value of each one of the non-intra coded original macroblocks with the average value to produce intermediate macroblocks.

18. The apparatus according to claim 17, wherein the original macroblocks represent an image, and the apparatus further comprises converter means for directly converting the resolution of the image by mapping the coefficient values of (1) the intra coded original macroblocks and (2) the intermediate macroblocks, to a second plurality of coefficient values in the converted macroblock in the spatial frequency domain.

19. An apparatus for changing the resolution of an MPEG encoded image, the decoder comprising:

variable length decoding means for receiving and decoding an input signal containing DCT values arranged in original macroblocks, the DCT values defining a first resolution of the image;

inverse dequantisation means for dequantising the DCT values;

first designating means for designating a converted macroblock (1) non-intra coded if a majority of original macroblocks are non-intra coded or (2) intra coded if the majority of the original macroblocks are intra coded;

second designating means for designating the prediction type of the converted macroblock (1) P-coded if a majority of the non-intra coded original macroblocks are P-coded or (2) B-coded if the majority of the non-intra coded original macroblocks are B-coded;

means for selecting a first macroblock group as (1) the original macroblocks which are P-coded if the converted macroblock is designated P-coded or (2) the original macroblocks which are B-coded if the converted macroblock is designated B-coded;

third designating means for designating the motion type of the converted macroblock as (1) field format if a majority of the selected macroblocks are in field format or (2) frame format if a majority of the selected macroblocks are in frame format;

means for generating intermediate macroblocks by setting the coefficient values to zero for the original macroblocks which (1) are intra coded or (2) have a different motion type or a different prediction type than the converted macroblock, when the converted macroblock is designated non-intra coded;

means for directly converting, when the converted macroblock is designated non-intra coded, the resolution of the image by mapping the DCT values of (1) the non-intra coded original macroblocks which have the same motion type and prediction type as the converted macroblock and (2) the intermediate macroblocks, to a second plurality of coefficient values in the converted macroblock in the spatial frequency domain;

means for averaging the DCT values of each of the intra coded original macroblocks to generate a respective average value for each one of the DCT values of each of the non-intra coded original macroblocks when the converted macroblock is designated intra coded;

means for replacing the coefficient values of each one of the non-intra coded original macroblocks with the respective average value to produce the intermediate macroblocks when the converted macroblock is designated intra coded; and means for directly converting, when the converted macroblock is designated intra coded, the resolution of the image by mapping the DCT values of (1) the intra coded original macroblocks and (2) the intermediate macroblocks, to a second plurality of coefficient values in the converted macroblock in the spatial frequency domain.

20. A method for generating format and control data for at least one converted macroblock which represents a plurality of original macroblocks, where the original macroblocks include both intra coded and non-intra coded macroblocks and each of the non-intra coded original macroblocks has a motion type of field format or frame format and a prediction type of P-coded or B-coded, the method comprising the steps of:

analyzing the intra coded and non-intra coded original macroblocks to determine whether (1) a majority of the original macroblocks are non-intra coded or (2) the majority of the original macroblocks are intra coded;

designating the converted macroblock (1) non intra coded if the majority of original macroblocks are non intra coded or (2) intra coded if the majority of the original macroblocks are intra coded;

designating the prediction type of the converted macroblock (1) P-coded if a majority of the non-intra coded original macroblocks are P-coded or (2) B-coded if the majority of the non-intra coded original macroblocks are B-coded;

selecting a first macroblock group as (1) the original macroblocks which are P-coded if the converted macroblock is designated P-coded if the converted macroblock is designated P-coded or (2) the original macroblocks which are B-coded if the converted macroblock is designated B-coded; and designating the motion type of the converted macroblock as (1) field format if a majority of the selected macroblocks are in field format or (2) frame format if a majority of the selected macroblocks are in frame format.

21. The method according to claim 20, wherein each of the original macroblocks has a motion vector and the converted macroblock has a converted motion vector, the method further comprising the steps of:

selecting a second macroblock group as (1) the first macroblock group which is in field format if the converted macroblock is designated field format or (2) the first macroblock group which is in frame format if the converted macroblock is designated frame format; and selecting a motion vector from the second macroblock group as the converted motion vector.

22. A method for generating format and control data for at least one converted macroblock from original macroblocks, where each of the original macroblocks is intra or non-intra coded and each of the original macroblocks contains coefficient values, the method comprising the steps of:

designating the converted macroblock (1) non-intra coded if a majority of original macroblocks are non-intra coded or (2) intra coded if the majority of the original macroblocks are intra coded;

averaging the coefficient values of each of the intra coded original macroblocks to generate a respective average value for each of the coefficient values of each one of the non-intra coded original macroblocks when the converted macroblock is designated intra coded; and replacing the coefficient values of each one of the non-intra coded original macroblocks with the respective average value to produce intermediate macroblocks.

* * * * *

UNITED STATES PATENT AND TRADE MARK OFFICE
CERTIFICATE OF CORRECTION

PATENT NO. : 5,926,573
DATED : July 20, 1999
INVENTOR(S) : Hee-Yong Kim, Saiprasad V. Naimpally It is certified that error appears in the above-identified patent and that said Letters Patent is hereby corrected as shown below:

In the Abstract   line 6,   "MPED" should read --MPEG--

In the Abstract   line 16,   the last sentence, after the word "image" insert the word -- at --

In column 26, line 1, of the Letters Patent, "infield" should read -- in field --

In column 27, line 44, of the Letters Patent, "signaling" should read -- designating --

Signed and Sealed this

Eleventh Day of April, 2000

Attest:

Attesting Officer

Q. TODD DICKINSON
Director of Patents and Trademarks